United States Patent
Zhou

(10) Patent No.: US 12,238,187 B2
(45) Date of Patent: Feb. 25, 2025

(54) COMMUNICATION METHOD, RELATED APPARATUS, DEVICE, AND STORAGE MEDIUM

(71) Applicant: Tencent Technology (Shenzhen) Company Limited, Guangdong (CN)

(72) Inventor: Zhitong Zhou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/992,587

(22) Filed: Nov. 22, 2022

(65) Prior Publication Data

US 2023/0082425 A1    Mar. 16, 2023

Related U.S. Application Data

(63) Continuation of application No. PCT/CN2022/084983, filed on Apr. 2, 2022.

(30) Foreign Application Priority Data

May 10, 2021   (CN) .......................... 202110505605.6

(51) Int. Cl.
*H04L 67/52* (2022.01)
*H04L 51/04* (2022.01)

(52) U.S. Cl.
CPC .............. *H04L 67/52* (2022.05); *H04L 51/04* (2013.01)

(58) Field of Classification Search
CPC ......... H04L 67/52; H04L 51/04; H04L 67/02; H04L 67/306; H04L 9/40; H04L 51/222;
(Continued)

(56) References Cited

U.S. PATENT DOCUMENTS 11,709,575 B2 * 7/2023 Bowden ................ G06F 3/0482
715/751
2014/0351351 A1 * 11/2014 Yu .......................... H04L 51/52
709/206

(Continued)

FOREIGN PATENT DOCUMENTS

CN        105610950 A      5/2016

OTHER PUBLICATIONS

International Search Report and Written Opinion received for PCT Patent Application No. PCT/CN2022/084983, mailed on Jul. 4, 2022, 13 pages (7 pages of English Translation and 6 pages of Original Document).

*Primary Examiner* — Cao H Nguyen
(74) *Attorney, Agent, or Firm* — ArentFox Schiff LLP

(57) ABSTRACT

A communication method is provided. In the method, a request to share locations in a group session is sent by a first messaging application to a second messaging application. The first messaging application is associated with a first user account and a first terminal device. The second messaging application is associated with a second user account and a second terminal device. The request to share locations includes destination location information. Further, a group session interface of the group session is displayed by the first messaging application in response to the request to share locations in the group session being accepted by the second user account. The group session includes the first user account and the second user account. Apparatus and non-transitory computer-readable storage medium counterpart embodiments are also contemplated.

20 Claims, 13 Drawing Sheets

(58) Field of Classification Search
CPC ..... H04L 51/52; H04L 67/141; H04L 12/185; H04L 63/0807; H04W 4/40
See application file for complete search history.

(56) References Cited

U.S. PATENT DOCUMENTS

| | | | | |
|---|---|---|---|---|
| 2014/0365901 | A1* | 12/2014 | Moha | G01C 21/367 |
| | | | | 715/738 |
| 2015/0245168 | A1* | 8/2015 | Martin | H04W 4/029 |
| | | | | 715/751 |

* cited by examiner

COMMUNICATION METHOD, RELATED APPARATUS, DEVICE, AND STORAGE MEDIUM

RELATED APPLICATIONS

The present application is a continuation of International Application No. PCT/CN2022/084983, filed on Apr. 2, 2022, which claims priority to Chinese Patent Application No. 202110505605.6, entitled "COMMUNICATION METHOD, RELATED APPARATUS, DEVICE, AND STORAGE MEDIUM" and filed May 10, 2021. The entire disclosures of the prior applications are hereby incorporated by reference in their entirety.

FIELD OF THE TECHNOLOGY

This application relates to the field of wireless communication technologies, including to a communication technology.

BACKGROUND OF THE DISCLOSURE

With the rapid development of vehicle technologies and network technologies, increasingly more people select vehicles as a traveling manner, and traveling as a vehicle group also gradually becomes a popular traveling manner. When multiple people travel as a team, if real-time positioning information may be shared, traveling may be convenient and the traveling efficiency and safety may be improved.

At present, some map applications have a team up traveling function, and members heading to a same destination may establish, through the team up traveling function, a virtual team up group based on the map applications. In the team up group, a user may transmit a team up message to automatically synchronize trip paths of members, for the user to view path information of each member.

However, if the user in the team up group intends to communicate with another friend in the team, the user needs to first start an instant messaging application, and then search for a corresponding friend in a friend list of the instant messaging application. As can be seen, communication performed in a team up scenario may require the user to frequently switch between different applications, operations may be complex, and the user experience may be affected.

SUMMARY

Aspects of this disclosure include communication methods, related terminal devices, and a non-transitory computer-readable storage medium. In an example, after a team up initiator successfully invites a friend to team up, a session group may be automatically generated, users in a team may directly communicate with each other in the session group without frequently switching between applications, thereby improving the operation convenience.

According to an aspect of this disclosure, a communication method is provided. In the communication method, a request to share locations in a group session is sent by a first messaging application to a second messaging application. The first messaging application is associated with a first user account and a first terminal device. The second messaging application is associated with a second user account and a second terminal device. The request to share locations includes destination location information. Further, a group session interface of the group session is displayed by the first messaging application in response to the request to share locations in the group session being accepted by the second user account. The group session includes the first user account and the second user account.

According to another aspect of this disclosure, a communication method is provided. In the communication method, a first request to share locations in a group session from a second messaging application is displayed by a first messaging application that is associated with a first user account and a first terminal device. The second application is associated with a second user and a second terminal device. The first request to share locations includes destination location information. A user input to accept the first request to share locations in the group session is received. A group session interface of the group session is displayed by the first messaging application in response to the first request to share locations in the group session being accepted. The group session includes the first user account and the second user account.

According to another aspect of this disclosure, a first terminal device is provided. The first terminal device includes processing circuitry that is configured to send, via a first messaging application that is associated with a first user account, a request to share locations in a group session to a second messaging application, the second messaging application being associated with a second user account and another terminal device. The request to share locations includes destination location information. The processing circuitry is further configured to display, via the first messaging application, a group session interface of the group session in response to the request to share locations in the group session being accepted by the second user account. The group session includes the first user account and the second user account.

According to another aspect of this disclosure, a second terminal device is provided. The second terminal device includes processing circuitry that is configured to display, via a first messaging application associated with a first user account and a first terminal device, a first request to share locations in a group session from a second messaging application. The second application is associated with a second user and a second terminal device. The first request to share locations including destination location information. The processing circuitry is configured to receive a user input to accept the first request to share locations in the group session. The processing circuitry is further configured to display, via the first messaging application, a group session interface of the group session in response to the first request to share locations in the group session being accepted. The group session includes the first user account and the second user account.

According to another aspect of this disclosure, a terminal device is provided, including a memory, a processor, and a bus system. The memory is configured to store a program. The processor is configured to execute the program in the memory, to perform the methods according to the foregoing aspects according to instructions in program code. The bus system is configured to connect the memory and the processor, to enable the memory to communicate with the processor.

According to another aspect of this disclosure, a non-transitory computer-readable storage medium is provided. The non-transitory computer-readable storage medium stores instructions which when executed by a processor cause the processor to perform the methods according to the foregoing aspects.

According to another aspect of this disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the methods according to the foregoing aspects.

As can be seen from the foregoing technical solutions, embodiments of this disclosure may have the following advantages.

In embodiments of this disclosure, a communication method is provided, the method is applicable to a first terminal device, and the first terminal device is a terminal device already using a first social account to log in to an instant messaging application. The first terminal device first obtains first location information, and then transmits a team up request to a second terminal device in response to a team up invitation instruction, where the team up request carrying the first location information, the second terminal device is a terminal device already using a second social account to log in to the instant messaging application, and the second social account is associated with the first social account. In a case that the second terminal device accepts the team up request, the second terminal device transmits a first response instruction to the first terminal device, for the first terminal device to display a session group through the instant messaging application in response to the first response instruction. In this case, the session group includes the first social account and the second social account. According to the foregoing method, after a team up initiator successfully invites a friend to team up, a session group for the instant messaging application may be automatically generated, where the session group includes a social account (namely, the first social account) of the team up initiator and a social account (namely, the second social account) of a recipient. Based on this, users in a team may directly communicate with each other in the session group without frequently switching between applications, thereby improving the operation convenience.

DESCRIPTION OF EMBODIMENTS

Embodiments of this disclosure include a communication method, an apparatus, a device, and a storage medium. After a team up initiator successfully invites a friend to team up, a session group may be automatically generated, users in a team may directly communicate with each other in the session group without frequently switching between applications, thereby improving the operation convenience.

The terms "first", "second", "third", "fourth", and the like (if existing) in the specification and the claims of this disclosure and the foregoing accompanying drawings are used for distinguishing similar objects, and do not need to be used for describing a particular sequence or order. It may be understood that the data termed in such a way is interchangeable in proper circumstances, so that the embodiments of this disclosure described herein for example, can be implemented in other sequences than the sequence illustrated or described herein. In addition, the terms "include", "corresponding to" and any other variants are intended to cover non-exclusive inclusion. For example, a process, method, system, product, or device that includes a series of steps or units is not necessarily limited to those expressly listed steps or units, but may include other steps or units not expressly listed or inherent to such a process, method, product, or device.

It is to be understood that, the communication method provided in this disclosure may be applicable to a team up traveling scenario. By providing path planning and path navigation for users through a map application, each member in a team may view real-time positioning information of himself/herself and other teammates, thereby realizing team up traveling. The real-time positioning information is used for indicating a current location of each member obtained through positioning. The members in the team may head to the same destination or may head to different destinations. For example, in a scenario, a member A creates a team and initiates a team up request, a member B and a member C join the team, so that the three members start off from respective locations and head to the same destination. During this period, each member may view real-time positioning information of himself/herself and other members. In another period, a member A creates a team and initiates a team up request, a member B and a member C join the team, so that the three members start off from the same location and head to different destinations respectively. During this period, each member may view real-time positioning information of himself/herself and other members.

Figure 1:
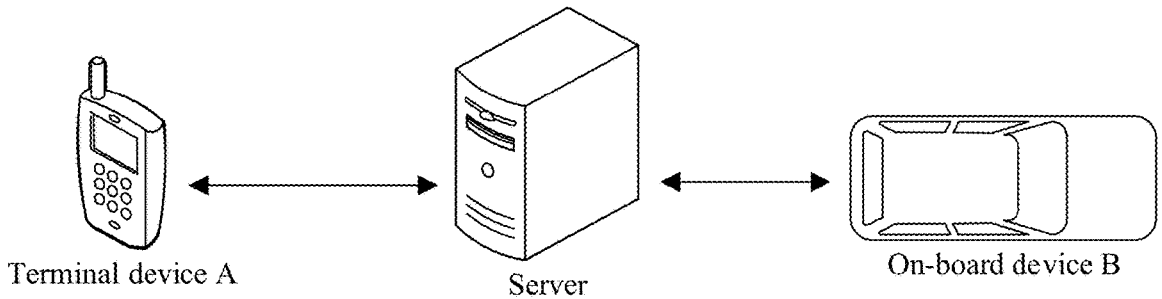
FIG. 1 is a schematic architectural diagram of a session group establishment system according to an embodiment of this disclosure.

For ease of session communication between the members in a navigation process, this disclosure provides a communication method, applicable to a session group establishment system shown in FIG. 1. As shown in the figure, the session group establishment system includes a server and a terminal device, and a client is deployed on the terminal device. A terminal device A is a terminal device used by a team up initiator, and an on-board device B is a terminal device used by a team up recipient. Based on this, the terminal device A initiates a team up request to the on-board device B through the server, and if the on-board device B accepts the team up request, namely, the recipient agrees to team up, the on-board device transmits a first response instruction to the terminal device A through the server. The terminal device A may also be an on-board device, and the on-board device B may also be a terminal device, which are not limited herein.

The server involved in this disclosure may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence (AI) platform. The terminal device may be a smartphone, a tablet computer, a notebook computer, a palmtop computer, a personal computer, a smart television, a smartwatch, an on-board device, or a wearable device, but is not limited thereto. The terminal device and the server may be directly or indirectly connected in a wired or wireless communication manner. This is not limited in this disclosure. The numbers of the servers and the terminal devices are also not limited.

In this disclosure, a close association between a map application and an instant messaging application (for example, WeChat or QQ) is established, so that users may synchronize team up information between the map application and the instant messaging application, thereby reducing team up costs of the users, improving the user experience, and lowering team up requirements. In addition, an on-board infotainment may be used as a virtual user through cooperation with the Internet of Vehicles, and team up synchronization is performed on the on-board infotainment and other applications, thereby improving a smart social attribute of an on-board infotainment product.

Figure 2:
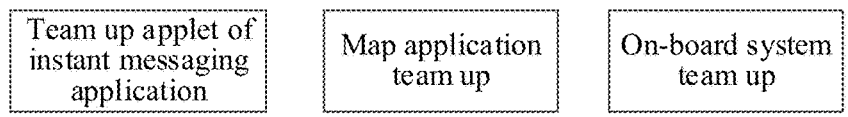
FIG. 2 is a schematic architectural diagram of a team up registration backend service according to an embodiment of this disclosure.
Figure 3:
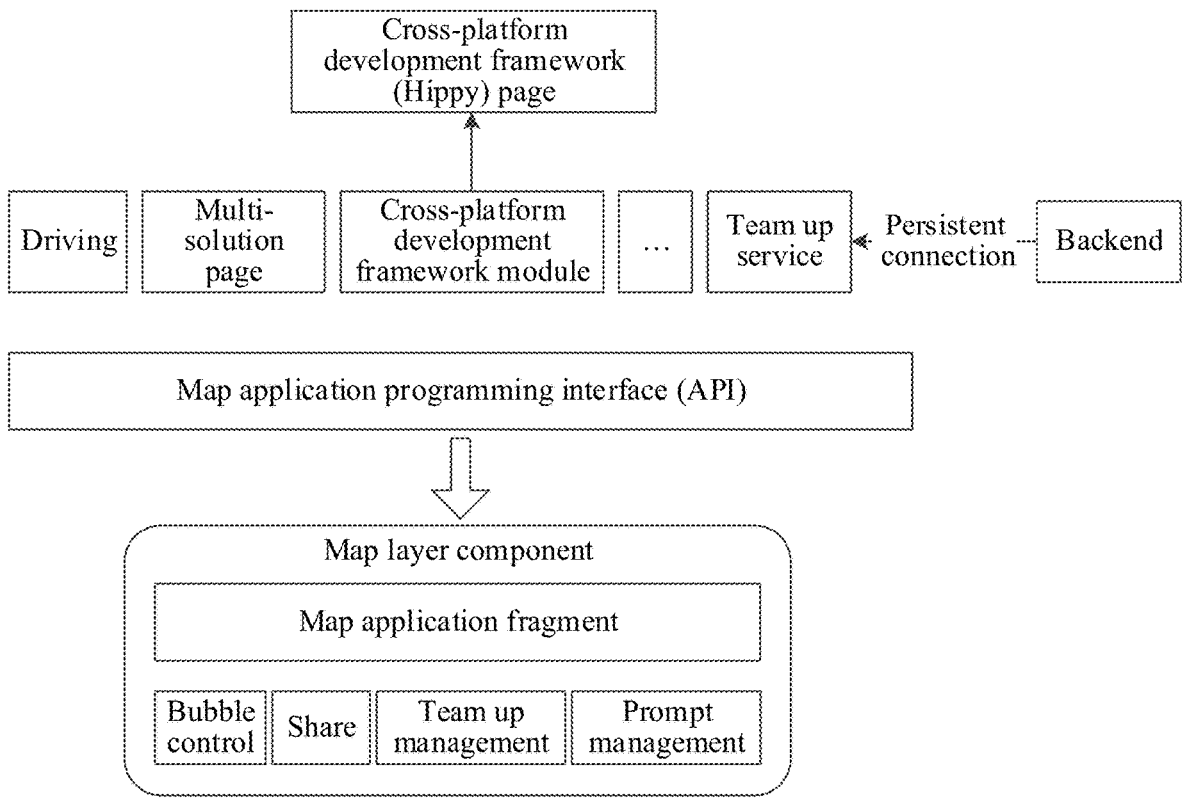
FIG. 3 is a schematic architectural diagram of a team up interface dynamic change according to an embodiment of this disclosure.

Based on this, the following describes an application framework implementing team up based on this disclosure with reference to FIG. 2 and FIG. 3. Referring to FIG. 2, FIG. 2 is a schematic architectural diagram of a team up registration backend service according to an embodiment of this disclosure. As shown in the figure, in a team up service, because a service for sharing locations of different system users between terminal devices in real time is required, location registration needs to be uniformly performed on the backend. A team up applet, map application team up, and on-board system team up of the instant messaging application are registered to a team up location registration backend service during entering. When existing a program or a persistent connection heartbeat request is not maintained with the backend service for a period of time (for example, 10 minutes), registration information in the team up location registration backend service may be canceled, and current latest location information may be transmitted to the backend service through a persistent connection heartbeat packet after a location changes. Based on this, team up information presented by each terminal device is complete and synchronized.

The product forms are different presentations, but core page logic and data services thereof are basically the same. Therefore, pages and logic may be reused, to synchronizing a plurality of ends through one encoding. For ease of understanding, referring to FIG. 3, FIG. 3 is a schematic architectural diagram of a team up interface dynamic change according to an embodiment of this disclosure. As shown in the figure, in this disclosure, a cross-platform development framework (Hippy) is used, to enable a developer to only need to write one set of code to be directly run on three platforms, which are respectively an iPhone operating system (iOS), Android, and web. Through the cross-platform capability provided by Hippy, logic and an interface of a team up user interface (UI) are reused, thereby improving the reusability of the UI to the greatest extent. An architecture in the map application is to complete a network request and service logic through a native method, and then provide services and data to the Hippy page, where the Hippy page is only responsible for presentation. A persistent connection is maintained between a team up service and the backend, location information of different ends may be stably updated as non-replied messages in the form of heartbeat packets through the persistent connection service of the team up location registration backend service, and one set of UI code is used to complete team up presentation logic of different ends through the cross-platform capability of Hippy, thereby improving the development efficiency.

Most service logic may be arranged on the native layer, and the native layer is responsible for performing interaction with the backend and processing data parsing. The native layer is layered, to provide map application programing interfaces (API), and each service group (for example, driving, a multi-solution page, and a home page) provides data for a Hippy module to provide a team up module so as to be used by a Hippy page layer. Interaction between the Hippy layer and the native layer is simple, and logic used for a base map in team up is controlled by the native layer for ease of management. However, the native layer cannot be shared by two ends, which requires to be implemented on the two ends respectively. A map layer component includes a map application fragment and a general component, and the general component includes a bubble control, share, team up management, and prompt management. The bubble control needs to be converted into a bitmap through a customize view (for example, the Hippy or native layer) and then transmitted to the base map. The team up management needs to determine whether an account is in the team according to a difference between accounts, so as to determine whether to provide a correct prompt or interface presentation. The prompt management provides a correct prompt according to team information.

In the map application fragment, the native layer encapsulates all service logic parts to be directly used by other components. A life cycle of the fragment is used to manage the map application fragment. By using the cross-platform capability of Hippy, most team up interfaces are effectively unified, and the same set of team up pages may be loaded through different configurations in the instant messaging application, the map application, and the on-board system, thereby improving the development efficiency of team up functions.

Figure 4:
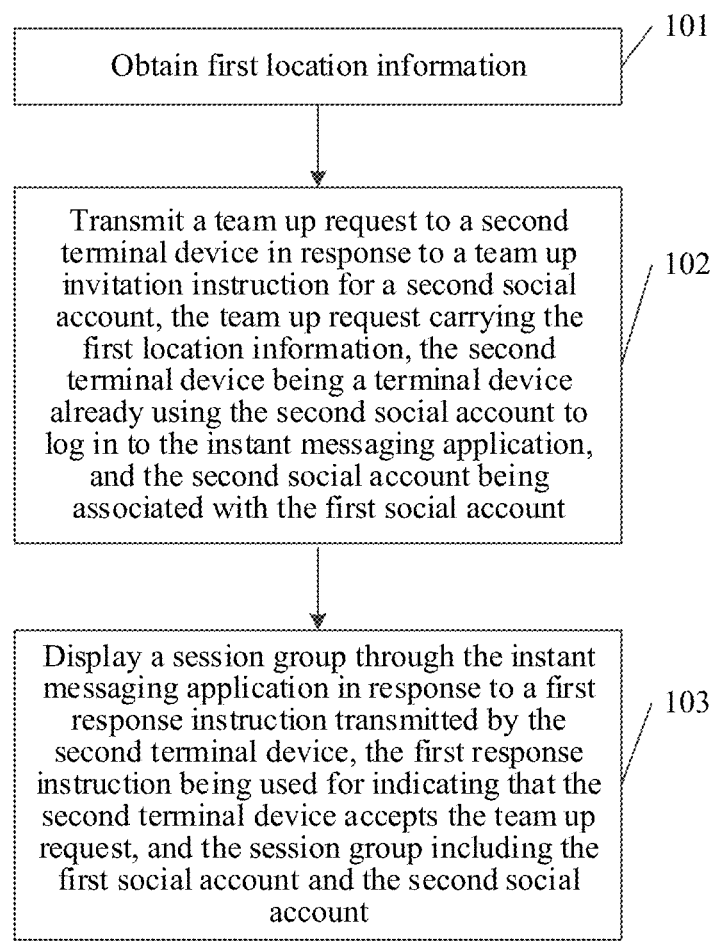
FIG. 4 is a schematic flowchart of a session group establishment method according to an embodiment of this disclosure.

The following describes the communication method in this disclosure in terms of a first terminal device in combination with the foregoing description, where the first terminal device is a terminal device already using a first social account to log in to an instant messaging application. Referring to FIG. 4, an embodiment of a session group establishment method in embodiments of this disclosure includes the following steps.

In step 101, a first terminal device obtains first location information.

In an embodiment, the first terminal device obtains first location information, where the first location information may be manually input by a user, or may be obtained through automatic positioning, or may be recommended based on a frequently-used place, which is not limited herein.

It may be understood that, the first terminal device is a terminal device used by a team up traveling initiator, and the first terminal device is bound to the first social account of the instant messaging application. It is assumed that the team up traveling initiator is a user A, the user A installs an instant messaging application on the first terminal device, and an account used by the user A in the instant messaging application is the first social account, for example, "user123".

In step 102, the first terminal device transmits a team up request to a second terminal device in response to a team up invitation instruction for a second social account, the team up request carrying the first location information, the second terminal device being a terminal device already using the second social account to log in to the instant messaging application, and the second social account being associated with the first social account. In an example, a request to share locations in a group session is sent by a first messaging application to a second messaging application. The first messaging application is associated with a first user account and a first terminal device. The second messaging application is associated with a second user account and a second terminal device. The request to share locations includes destination location information In an embodiment, the team up traveling initiator triggers a team up invitation instruction for a second social account through the first terminal device, and the team up invitation instruction carries the second social account. The first terminal device determines, in response to the team up invitation instruction, a second terminal device bound to the second social account. Therefore, the first terminal device transmits a team up request to the second terminal device, where the team up request carries the first location information, for a recipient to determine whether to accept the team up request according to the first location information. In some cases, the team up request may further carry the first social account.

It may be understood that, the second terminal device is a terminal device used by a team up traveling recipient, and the second social account is associated with the first social account, namely, the first social account and the second social account may have a "friend" relationship or a frequent contact relationship. It is assumed that the team up traveling recipient is a user B, and the user B installs an instant messaging application on the second terminal device. The instant messaging application installed by the user B on the second terminal device and the instant messaging application installed by the user A on the first terminal device are the same application or different applications that may invoke user information from each other.

In step 103, the first terminal device displays a session group through the instant messaging application in response to a first response instruction transmitted by the second terminal device, the first response instruction being used for indicating that the second terminal device accepts the team up request, and the session group including the first social account and the second social account. In an example, a group session interface of the group session is displayed by the first messaging application in response to the request to share locations in the group session being accepted by the second user account. The group session including the first user account and the second user account In an embodiment, if the team up traveling recipient accepts the team up request, the second terminal device generates a first response instruction and transmits the first response instruction to the first terminal device, where the first response instruction is used for indicating that the second terminal device accepts the team up request. Based on this, in one case, a server of the instant messaging application creates a temporary session, namely, generates a session group. In another case, the first terminal device or the second terminal device creates a temporary session, namely, generates a session group. The first terminal device and the second terminal device respectively creates a local temporary session, namely, generates a session group. Regardless of a generation manner of the session group, the session group includes the first social account and the second social account. Based on this, the team up traveling initiator and the team up recipient may communicate with each other in the session group without manually creating a session.

Figure 5:
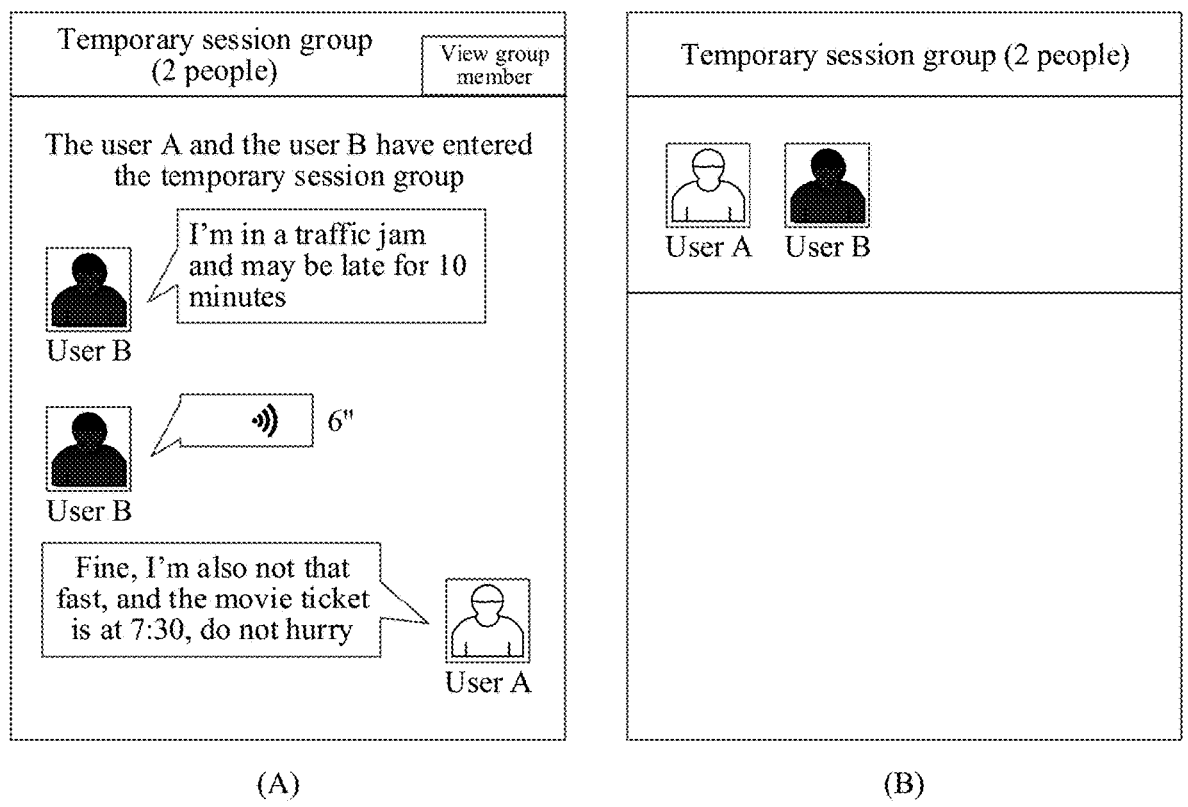
FIG. 5 is a schematic diagram of an interface of creating a temporary session group according to an embodiment of this disclosure.

For ease of understanding, referring to FIG. 5, FIG. 5 is a schematic diagram of an interface of creating a temporary session group according to an embodiment of this disclosure. It is assumed that the team up traveling initiator is a user A and the team up recipient is a user B, after the user B accepts the team up request, a temporary session group is automatically generated, and a message that a member has joined the team is automatically transmitted in the session group. According to an interface shown by a diagram (A) in FIG. 5, the user A and the user B may communicate in the session group, and a communication manner includes, but is not limited to, speech and text. After a "view group member" control is clicked, an interface shown by a diagram (B) in FIG. 5 is displayed, and members in the session group are displayed in the interface, where each member corresponds to one social account. It is assumed that the user A corresponds to a first social account and the user B corresponds to a second social account, so that the session group includes the first social account and the second social account.

The interface shown in FIG. 5 is merely exemplary, and in an actual application, a layout and displayed content of the interface may be adjusted as required, which is not limited herein.

The foregoing example is described by using an example in which the session group only includes two members. In an actual application, one session group may include a team up traveling initiator and at least one team up traveling recipient, and one recipient herein is merely exemplary and is not to be construed as a limitation to this disclosure.

In embodiments of this disclosure, a communication method is provided. According to the foregoing method, after a team up initiator successfully invites a friend to team up, a session group for the instant messaging application may be automatically generated, where the session group includes a social account of the team up initiator and a social account of a recipient. Based on this, users in a team may directly communicate with each other in the session group without frequently switching between applications, thereby improving the operation convenience.

Based on the embodiment corresponding to FIG. 4, in another embodiment provided in embodiments of this disclosure, before the first terminal device obtains the first location information, the method may further include displaying a map application interface by the first terminal device, where the map application interface provides a team up creation control, and displaying a team up page by the first terminal device in response to a selection instruction for the team up creation control, where the team up page displays an information input region. That the first terminal device obtains the first location information may specifically include obtaining, in response to a text input operation for the information input region, the first location information by the first terminal device according to the text input operation.

In an embodiment, a manner for implementing team up traveling based on a map application is described. If a map application has been installed on the first terminal device, the team up initiator may directly start the map application and input a destination, namely, the first location information through the map application. It may be understood that, the first location information may be a destination to which the team up traveling initiator is about to head or may be a destination set by the team up traveling initiator for the entire team, which is not limited herein.

Figure 6:
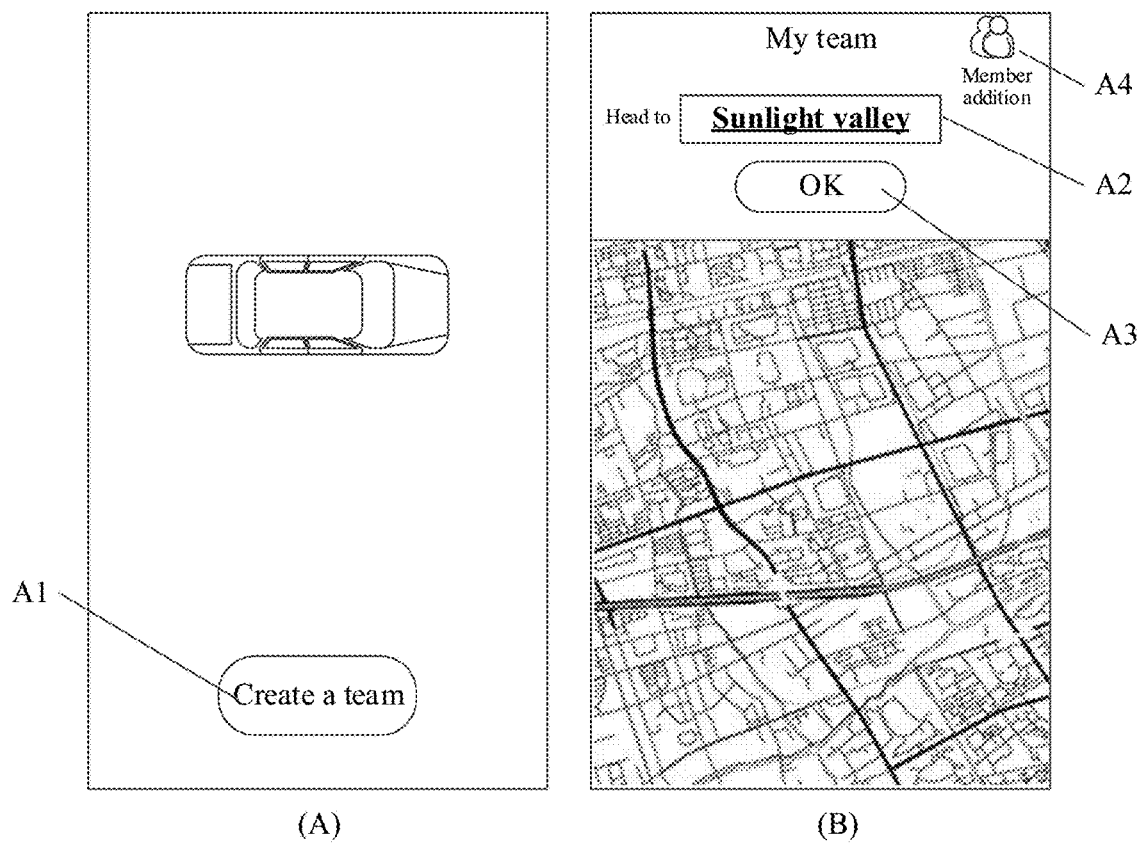
FIG. 6 is a schematic diagram of an interface of obtaining location information based on a map application according to an embodiment of this disclosure.

For ease of understanding, FIG. 6 is a schematic diagram of an interface of obtaining location information based on a map application according to an embodiment of this disclosure. As shown by a diagram (A) in FIG. 6, A1 is used for indicating a team up creation control, namely, a "team creation" control. Based on this, in the map application interface, the team up traveling initiator may click the "team creation" control to trigger a selection instruction for the team up creation control, so as to enter a team up page provided by the map application. The team up page may be shown by a diagram (B) in FIG. 6, and a created team may be "my team". An information input region indicated by A2 is provided on the team up page, the team up traveling initiator may perform a text input operation for the information input region, and the text input operation may be to input text content, for example, "sunlight valley". After input is completed, an "OK" control indicated by A3 is clicked to determine the "sunlight valley" as the first location information.

The team up traveling initiator may further click a "member addition" control indicated by A4, to share team up information with a friend. If the friend accepts the team up request, a new member is automatically added to the team up page of the map application, and a temporary session group is created in the instant messaging application simultaneously.

The interface shown in FIG. 6 is merely exemplary, and in an actual application, a layout and displayed content of the interface may be adjusted as required, which is not limited herein.

In embodiments of this disclosure, a manner for implementing team up traveling based on a map application is provided, and according to the foregoing manner, the team up initiator may directly trigger a team up traveling function based on an installed map application. Therefore, the team up capability of the map application and the communication capability of the instant messaging application are tightly combined, to improve the communication convenience.

Based on the embodiment corresponding to FIG. 4, in another embodiment provided in embodiments of this disclosure, before the first terminal device obtains the first location information, the method may further include displaying a session interface of the instant messaging application by the first terminal device, where the session interface provides a team up creation control, the session interface is a communication interface between the first social account and at least one social account, and the at least one social account includes the second social account. The method may further include displaying a team up page by the first terminal device in response to a selection instruction for the team up creation control, where the team up page displays an information input region. That the first terminal device obtains the first location information may specifically include obtaining, in response to a text input operation for the information input region, the first location information by the first terminal device according to the text input operation.

In an embodiment, a manner for implementing team up traveling based on an instant messaging application is described. If an instant messaging application has been installed on the first terminal device, the team up initiator may directly start the instant messaging application and input a destination, namely, the first location information through a team up traveling function provided by the instant messaging application. It may be understood that, the first location information may be a destination to which the team up traveling initiator is about to head or may be a destination set by the team up traveling initiator for the entire team, which is not limited herein.

Figure 7:
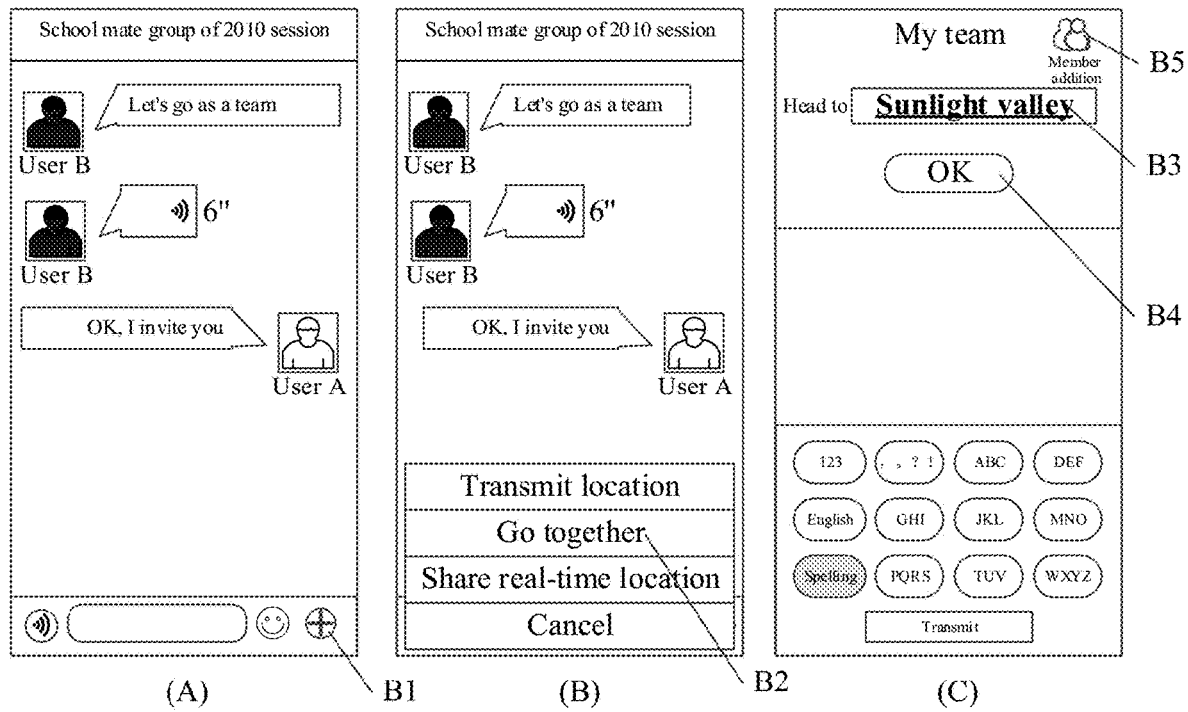
FIG. 7 is a schematic diagram of an interface of obtaining location information based on an instant messaging application according to an embodiment of this disclosure.

For ease of understanding, FIG. 7 is a schematic diagram of an interface of obtaining location information based on an instant messaging application according to an embodiment of this disclosure. As shown by a diagram (A) in FIG. 7, B1 is used for indicating a functional control, and after the team up traveling initiator clicks the functional control indicated by B1, a team up creation control, namely, a "go together" control indicated by B2 may be further viewed in a session interface shown by a diagram (B) in FIG. 7. The session interface represents a communication interface between a first social account and at least one social account, where the first social account is a social account used by the team up traveling initiator. Based on this, in the session interface, the team up traveling initiator may click the "go together" control to trigger a selection instruction for the team up creation control, so as to enter a team up page provided by the instant messaging application. The team up page may be shown by a diagram (C) in FIG. 7. An information input region indicated by B3 is provided on the team up page, the team up traveling initiator may perform a text input operation for the information input region, and the text input operation may be to input text content, for example, "sunlight valley". After input is completed, an "OK" control indicated by B4 is clicked to determine the "sunlight valley" as the first location information.

The team up traveling initiator may further click a "member addition" control indicated by B5, to share team up information with a friend. If the friend accepts the team up request, a new member is automatically added to the team up page of the instant messaging application, and a temporary session group is created in the instant messaging application simultaneously.

The interface shown in FIG. 7 is merely exemplary, and in an actual application, a layout and displayed content of the interface may be adjusted as required, which is not limited herein.

In embodiments of this disclosure, a manner for implementing team up traveling based on an instant messaging application is provided, and according to the foregoing manner, the team up initiator may directly trigger a team up traveling function based on an installed instant messaging application. Therefore, the team up capability of the map application and the communication capability of the instant messaging application are tightly combined, and map team up and messages in the instant messaging application may be synchronized with each other. Even if a user does not download the map application, the user may still join the team, and receive and transmit team up messages to each member in the team, thereby improving the communication convenience.

Based on the embodiment corresponding to FIG. 4, in another embodiment provided in embodiments of this disclosure, before the first terminal device obtains the first location information, the method may further include displaying an application main interface of the instant messaging application by the first terminal device, where the application main interface provides a subprogram entry control. The method may further include displaying a team up page of an application subprogram by the first terminal device in response to a selection instruction for the subprogram entry control, where the team up page displays an information input region, and the application subprogram is executed in an environment provided by the instant messaging application. That the first terminal device obtains the first location information may specifically include obtaining, in response to a text input operation for the information input region, the first location information by the first terminal device according to the text input operation.

In an embodiment, a manner for implementing team up traveling based on an applet (namely, an application subprogram, or may be referred to as a small program) is described. If an instant messaging application has been installed on the first terminal device, the team up initiator may directly start the instant messaging application and input a destination, namely, the first location information through a team up traveling function provided by a small program in the instant messaging application. It may be understood that, the first location information may be a destination to which the team up traveling initiator is about to head or may be a destination set by the team up traveling initiator for the entire team, which is not limited herein.

Figure 8:
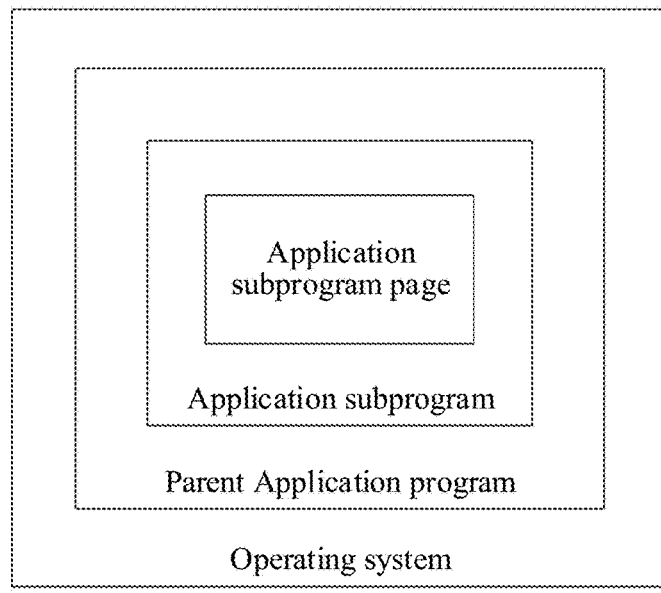
FIG. 8 is a schematic diagram of an application architecture of an applet according to an embodiment of this disclosure.

The following describes an application framework of a small program with reference to FIG. 8. FIG. 8 is a schematic diagram of an application architecture of an applet according to an embodiment of this disclosure. As shown in the figure, an operating system is run on a terminal device, and a parent application program is run on the operating system. An application subprogram is generated in an environment provided by the parent application program, and the application subprogram includes an application subprogram page. The terminal device may obtain an application subprogram identifier locally or from a server by using the parent application program.

The operating system (OS) is a computer program that manages and controls hardware and software resources of the terminal device and is most basic system software that is directly run on a bare computer of the terminal device; and an application program needs to be run under support of the operating system.

The parent application program is an application program carrying the application subprogram and provides an environment for implementation of the application subprogram. The parent application program is a native application program. The native application program is an application program that may be directly run on the operating system. The parent application program may be a social application program, a dedicated application program dedicatedly supporting an application subprogram, a file management application program, an email application program, or a game application program. The social application program includes an instant messaging application, a social network service (SNS), or a live streaming application.

The child application is an application that may be implemented in the environment provided by the parent application. The application subprogram may be, for example, a social application program, a file management application program, an email application program, or a game application program.

In an embodiment, the terminal device may present an application subprogram list by using the parent application program, receive a selection instruction for options in the application subprogram list, and determine an option selected in the application subprogram list according to the selection instruction, to obtain an application subprogram identifier corresponding to the selected option.

Figure 9:
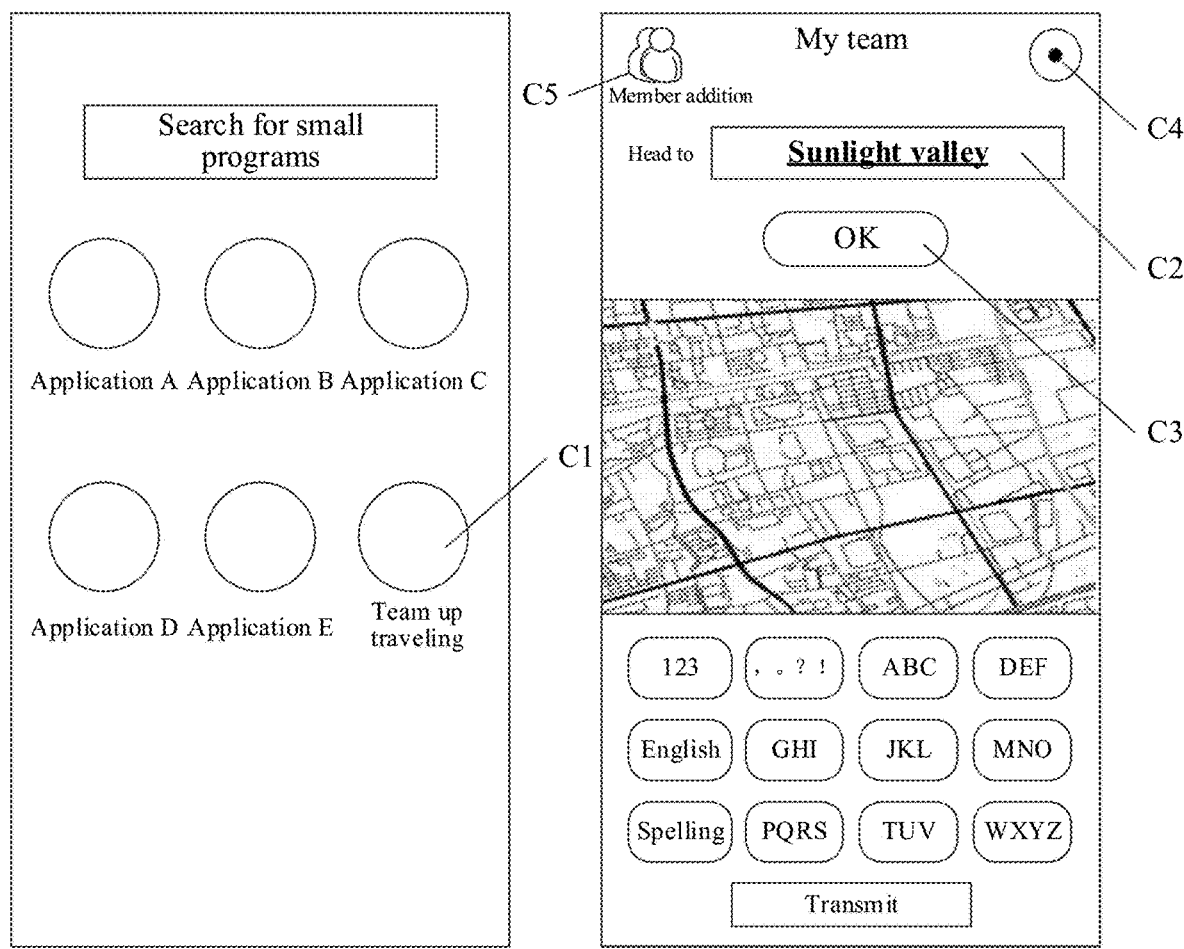
FIG. 9 is a schematic diagram of an interface of obtaining location information based on an applet according to an embodiment of this disclosure.

For ease of understanding, FIG. 9 is a schematic diagram of an interface for obtaining location information based on an applet according to an embodiment of this disclosure. A diagram (A) in FIG. 9 shows an application main interface of an instant messaging application, the application main interface provides a program entry control, and the program entry control includes at least one subprogram entry control. C1 is used for indicating a subprogram entry control corresponding to "team up traveling", and after the team up traveling initiator clicks the subprogram entry control indicated by C1, an information input region indicated by C2 may be further viewed on a team up page of an application subprogram shown by a diagram (B) in FIG. 9. Based on this, the team up traveling initiator may perform a text input operation for the information input region indicated by C2, and the text input operation may be to input text content, for example, "sunlight valley". After input is completed, an "OK" control indicated by C3 is clicked to determine the "sunlight valley" as the first location information. The team up traveling initiator may further click a control indicated by C4, to exit a small program interface of "team up traveling".

The team up traveling initiator may further click a "member addition" control indicated by C5, to share team up information with a friend. If the friend accepts the team up request, a new member is automatically added to the team up page of the applet, and a temporary session group is created in the instant messaging application simultaneously.

The interface shown in FIG. 9 is merely exemplary, and in an actual application, a layout and displayed content of the interface may be adjusted as required, which is not limited herein.

In embodiments of this disclosure, a manner for implementing team up traveling based on an applet is provided, and according to the foregoing manner, the team up initiator may directly trigger a team up traveling function based on an applet. Therefore, the team up capability of the map application and the communication capability of the instant messaging application are tightly combined, and map team up and messages in the instant messaging application may be synchronized with each other. Even if a user does not download the map application, the user may still join the team, and receive and transmit team up messages to each member in the team, thereby improving the communication convenience.

Based on the embodiment corresponding to FIG. 4, in another embodiment of this disclosure, before the first terminal device obtains the first location information, the method may further include displaying an on-board map interface by the first terminal device through an on-board system, where the on-board system is logged in to by using the first social account, and the on-board map interface provides a team up creation control. The method may further include displaying a team up page by the first terminal device through the on-board system in response to a selection instruction for the team up creation control, where the team up page displays an information input region. That the first terminal device obtains the first location information may specifically include obtaining, in response to a text input operation for the information input region, the first location information by the first terminal device according to the text input operation.

In an embodiment, a manner for implementing team up traveling based on an on-board system is described. If an instant messaging application has been installed on the first terminal device and an on-board system is installed on a vehicle driven by the team up traveling initiator, the on-board system needs to be associated with the instant messaging application in advance, and the on-board system is also logged into by using the first social account. Therefore, the team up traveling initiator may view information about other members in the team through the on-board system. The team up traveling initiator may directly input a destination, namely, the first location information through a team up traveling function provided by the on-board system. It may be understood that, the first location information may be a destination to which the team up traveling initiator is about to head or may be a destination set by the team up traveling initiator for the entire team, which is not limited herein.

Figure 10:
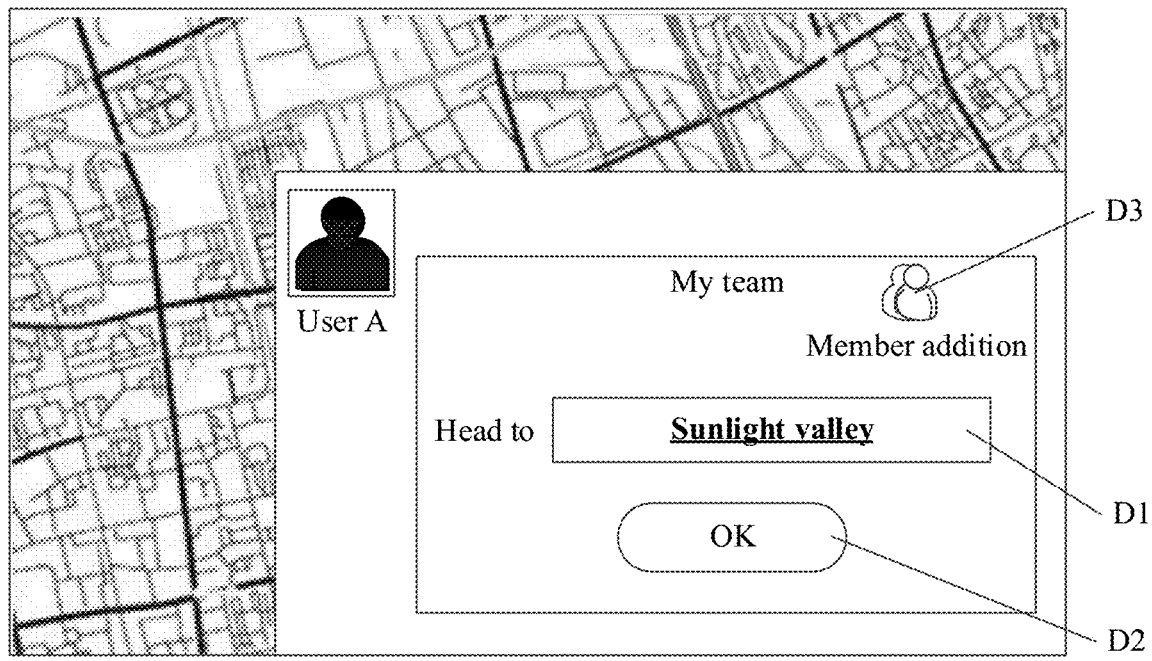
FIG. 10 is a schematic diagram of an interface of obtaining location information based on an on-board system according to an embodiment of this disclosure.

A team up creation control is provided in the on-board map interface, and after a selection instruction for the team up creation control is triggered, the on-board system displays a component page shown in FIG. 10. For ease of understanding, FIG. 10 is a schematic diagram of an interface of obtaining location information based on an on-board system according to an embodiment of this disclosure. As shown in the figure, an information input region indicated by D1 is provided on the team up page, the team up traveling initiator may perform a text input operation for the information input region, and the text input operation may be to input text content, for example, "sunlight valley". After input is completed, an "OK" control indicated by D2 is clicked to determine the "sunlight valley" as the first location information.

The team up traveling initiator may further click a "member addition" control indicated by D3, to share team up information with a friend. If the friend accepts the team up request, a new member is automatically added to the team up page of the on-board system, and a temporary session group is created in the instant messaging application simultaneously.

Figure 11:
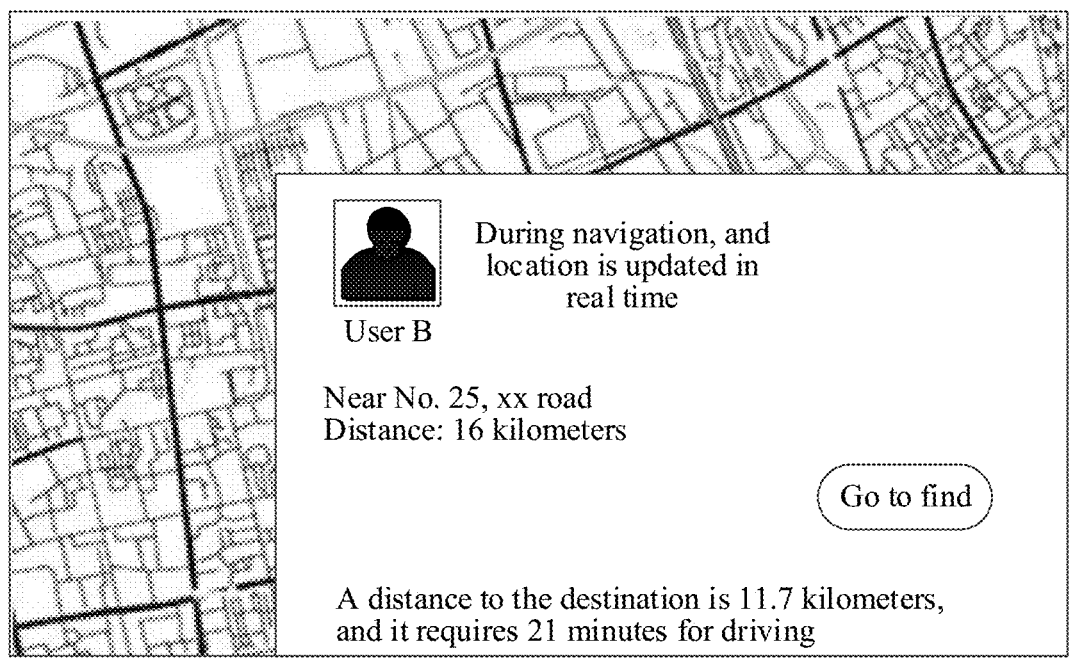
FIG. 11 is a schematic diagram of an interface of viewing a real-time position of a member based on an on-board system according to an embodiment of this disclosure.

After team up is completed, the team up traveling initiator may further view real-time positioning information of the members in the team on the on-board system. For ease of understanding, FIG. 11 is a schematic diagram of an interface of viewing a real-time position of a member based on an on-board system according to an embodiment of this disclosure. As shown in the figure, it is assumed that a user B is added to the team, in this case, the team up traveling initiator may view real-time positioning information of the user B and determine a distance between a current location of himself/herself and a current location of the user B according to the real-time positioning information. For example, the real-time positioning information "near No. 25, xx road" of the user B is displayed, and the distance "16 kilometers" between the initiator and the user B is also displayed. After a control "go to find" is clicked, a path from the location of the team up traveling initiator to the location of the user B may be further generated, for the team up traveling initiator to find the user B.

The interfaces shown in FIG. 10 and FIG. 11 are merely exemplary, and in an actual application, a layout and displayed content of the interfaces may be adjusted as required, which is not limited herein.

In embodiments of this disclosure, a manner for implementing team up traveling based on an on-board system is provided, and according to the foregoing manner, the team up initiator may directly trigger a team up traveling function based on an on-board system. Therefore, the team up capability of the map application, the on-board system, and the communication capability of the instant messaging application are tightly combined, and map team up and messages in the instant messaging application may be synchronized with each other. Even if a user does not download the map application, the user may still join the team, and receive and transmit team up messages to each member in the team, thereby improving the communication convenience.

Based on the embodiment corresponding to FIG. 4, in another embodiment provided in embodiments of this disclosure, before the first terminal device transmits a team up request to a second terminal device in response to a team up invitation instruction, the method may further include displaying a friend list corresponding to the instant messaging application by the first terminal device in response to a friend list view request, where the friend list includes the second social account; and triggering the team up invitation instruction by the first terminal device in response to a selection instruction for the second social account in the friend list.

In an embodiment, a manner for triggering a team up invitation instruction is described. As can be understood from the foregoing embodiments, the user may further enter a corresponding friend list through a bound social account, to select at least one social account from the friend list and invite the at least one social account to join a team. It may be understood that, if the social account bound to the user is an account of an instant messaging application A, the friend list is a friend list of the instant messaging application A; and if the social account bound to the user is an account of an instant messaging application B, the friend list is a friend list of the instant messaging application B. The following is described by using an example in which the user is a team up traveling initiator. It may be understood that, for other members already in the team, they may add other friends in the friend list in a similar manner.

Figure 12:
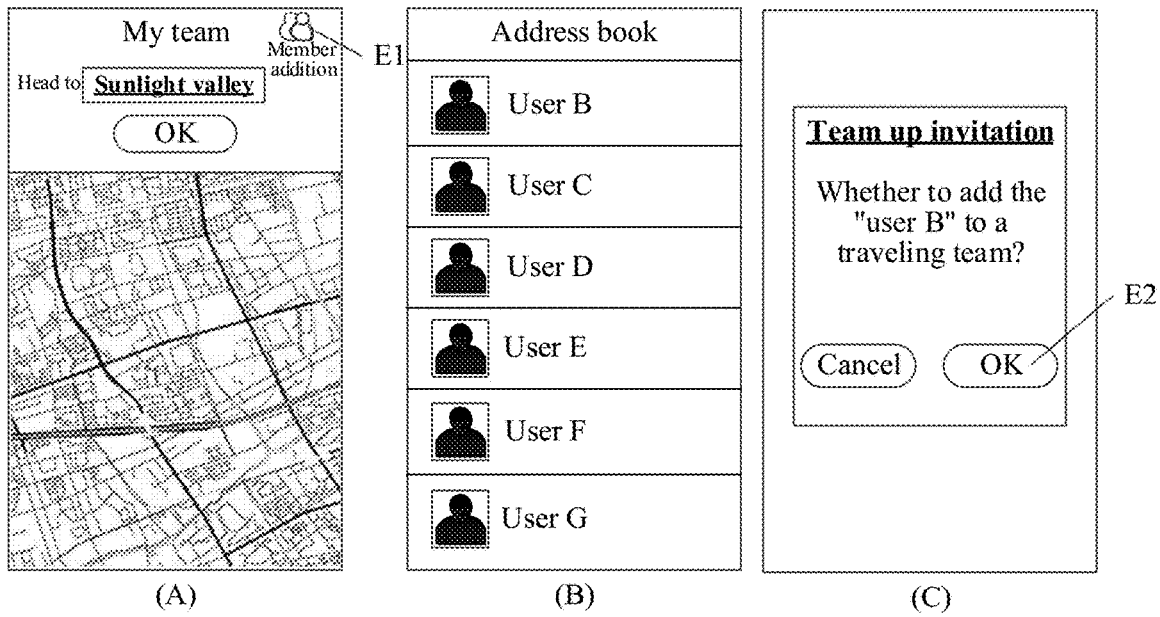
FIG. 12 is a schematic diagram of an interface of selecting a team up teammate through a friend list according to an embodiment of this disclosure.

For ease of understanding, FIG. 12 is a schematic diagram of an interface of selecting a team up teammate through a friend list according to an embodiment of this disclosure. As shown by a diagram (A) in FIG. 12, it is assumed that the team up traveling initiator uses a first social account, and the first social account is a social account of an instant messaging application A. Based on this, after the team up traveling initiator clicks a "member addition" control indicated by E1, a friend list view request is triggered, and a friend list (namely, an address book) shown by a diagram (B) in FIG. 12 is displayed. It is assumed that the second social account is a "user B", the team up traveling initiator clicks a portrait of the "user B" in the friend list to trigger a selection instruction for the second social account in the friend list.

In one case, after the selection instruction for the second social account in the friend list is triggered, a team up invitation instruction is directly generated. In another case, after the selection instruction for the second social account in the friend list is triggered, an interface shown by a diagram (C) in FIG. 12 may be displayed. The interface prompts whether the team up traveling initiator determines to add the user B to a traveling team, and a team up invitation instruction is generated if an "OK" control indicated by E2 is clicked. If a "No" control is clicked, the friend list or the team up page is returned.

The interface shown in FIG. 12 is merely exemplary, and in an actual application, a layout and displayed content of the interface may be adjusted as required, which is not limited herein.

In embodiments of this disclosure, a manner for triggering a team up invitation instruction is provided. Through the foregoing manner, the team up initiator may also directly invoke a friend list to select one or more friends and invite the one or more friends to a traveling team. This process may be directly implemented in the instant messaging application or may be implemented by a map application pulling up a friend list of the team up initiator. Therefore, the solution has relatively high flexibility and operability.

Based on the embodiment corresponding to FIG. 4, in another embodiment of this disclosure, before the first terminal device displays a session group through the instant messaging application, the method may further include canceling at least one of displaying the session group in the instant messaging application by the first terminal device in a case that a duration of the session group reaches a duration threshold;

displaying the session group in the instant messaging application by the first terminal device in a case that a current moment reaches a preset moment;

displaying the session group in the instant messaging application by the first terminal device in a case that each social account in the session group exits the session group; or displaying the session group in the instant messaging application by the first terminal device in a case of detecting a dismiss instruction for the session group.

In an embodiment, a plurality of manners for automatically deleting a session group are described. As can be understood from the foregoing embodiments, an automatically created session group belongs to a temporary session, so that the session group may be automatically deleted in a case of meeting a preset condition. Based on this, the following is described in combination with four exemplary preset conditions.

I. Deleting a Session Group Based on a Duration Threshold.

Timing starts from a moment at which a session group is established, and if a duration of the session group reaches a duration threshold, the session group is deleted in the instant messaging application. It is assumed that the duration threshold is 24 hours and the session group is established at 13:15:08, the session group is automatically deleted at 13:15:08 of a next day.

II. Delete a Session Group Based on a Preset Moment.

A team up traveling initiator may set a preset moment for a session group, and if a current moment reaches the preset moment, the session group is deleted in the instant messaging application. It is assumed that the preset moment is 13:15:08 on May 5, 2021, the session group is automatically deleted in a case that the current moment is 13:15:08 on May 5, 2021.

III. Delete a Session Group Based on an Exit Operation of Team Members.

A session group includes at least two social accounts, each social account corresponds to one member in the team, and if all members in the team exit the team, it indicates that each social account in the session group exits the session group, and the session group is then deleted in the instant messaging application. It is assumed that two members exist in the team, and the two members respectively correspond to a first social account and a second social account in the session group. In a case that both the two members exit the team, the first social account and the second social account in the session group are automatically cleared, and the session group may be automatically deleted.

IV. Deleted a Session Group Based on an Operation of a Team Up Traveling Initiator.

A team up traveling initiator has a permission to dismiss a session group, and if the team up traveling initiator triggers a dismiss instruction in the session group, the session group is deleted in the instant messaging application.

In embodiments of this disclosure, a plurality of manners for automatically deleting a session group are provided. Through the foregoing manners, for a temporarily created session group, a plurality of strategies are designed to automatically delete the session group. Therefore, on one hand, the diversity and flexibility of solution implementation are improved, and on the other hand, it is unnecessary to depend on manual operations, thereby improving the convenience of the solution.

Based on the embodiment corresponding to FIG. 4, in another embodiment provided in this disclosure, before the first terminal device displays a session group through the instant messaging application, the method may further include changing the first location information by the first terminal device to obtain updated location information; and displaying the updated location information in the session group by the first terminal device in response to a location switching instruction.

In an embodiment, a manner for notifying location updating performed in a session group is described. Team up information change may be notified in the session group. It may be understood that, team up information change may also be notified on a team up page of a map application and other similar pages, which is not described herein again. The following is described by using an example in which location information updating is notified in a session group.

Figure 13:
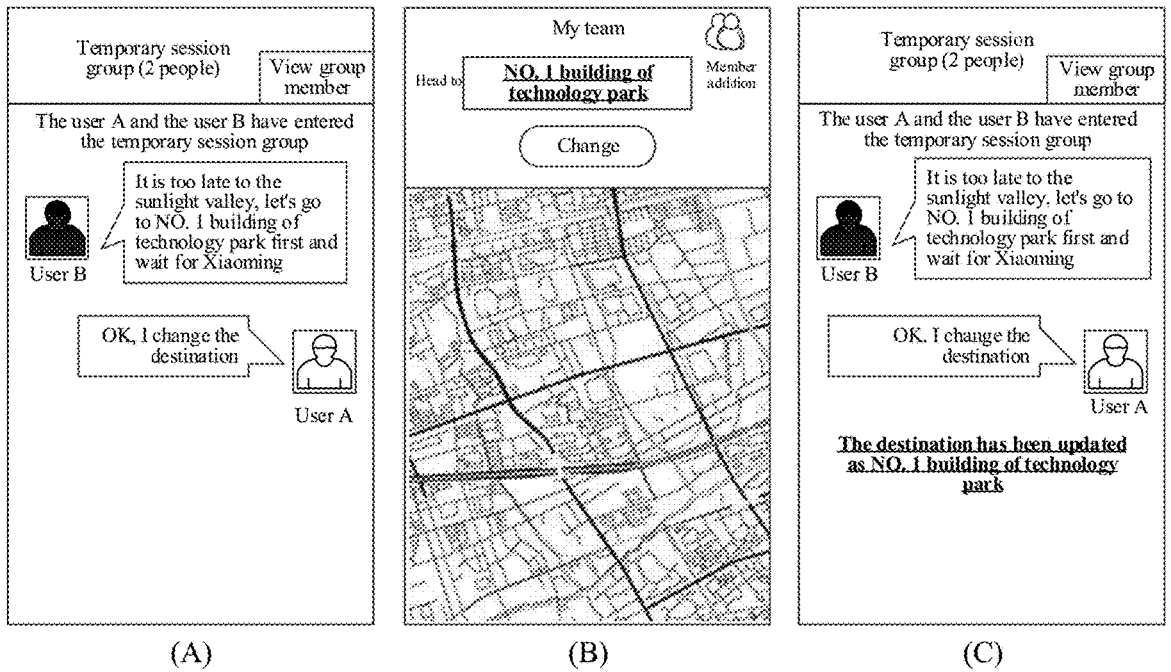
FIG. 13 is a schematic diagram of an interface of displaying location information updating in a session group according to an embodiment of this disclosure.

For ease of understanding, FIG. 13 is a schematic diagram of an interface of displaying location information updating in a session group according to an embodiment of this disclosure. As shown by a diagram (A) in FIG. 13, a first social account and a second social account are included in a created session group, and members that belong to a same team may communicate with each other in the session group. If the team up traveling initiator intends to change a traveling destination, an interface shown by a diagram (B) in FIG. 13 is entered. The team up traveling initiator inputs updated location information in the interface, for example, "Building NO. 1 of technology park", and a location switching instruction is triggered after a "change" control is clicked. Based on this, in response to the location switching instruction, the updated location information is displayed in a session group shown by a diagram (C) in FIG. 13.

The updated location information is not only synchronously updated to the session group of the instant messaging application, and may also be presented in team up interfaces of other applications in a form of a pop-up or a rolling notification.

The interface shown in FIG. 13 is merely exemplary, and in an actual application, a layout and displayed content of the interface may be adjusted as required, which is not limited herein.

In embodiments of this disclosure, a manner for notifying location updating performed in a session group is provided. Through the foregoing manner, if a member in a team changes destination information, updated destination information may be synchronously displayed in the session group, for members in the team to know and view the updated information in time, thereby improving the flexibility of the solution.

Based on the embodiment corresponding to FIG. 4, in another embodiment provided in this disclosure, the method may further include displaying a map navigation page by the first terminal device in response to a navigation viewing instruction, where the map navigation page displays real-time positioning information of the first social account and real-time positioning information of the second social account. The method may further include displaying a first prompt message on the map navigation page by the first terminal device in a case that the real-time positioning information of the first social account successfully matches the first location information. The method may further include displaying a second prompt message on the map navigation page by the first terminal device in a case that the real-time positioning information of the second social account successfully matches the first location information.

In an embodiment, a manner for notifying that a same location is reached through a map navigation page is described. As can be understood from the foregoing embodiments, all members in a team may head to a same destination, and the destination corresponds to the first location information. Based on this, in a case that a member in the team reaches the destination, a prompt message may be displayed on the map navigation page. The following is described by using an example in which the team includes two members.

Figure 14:
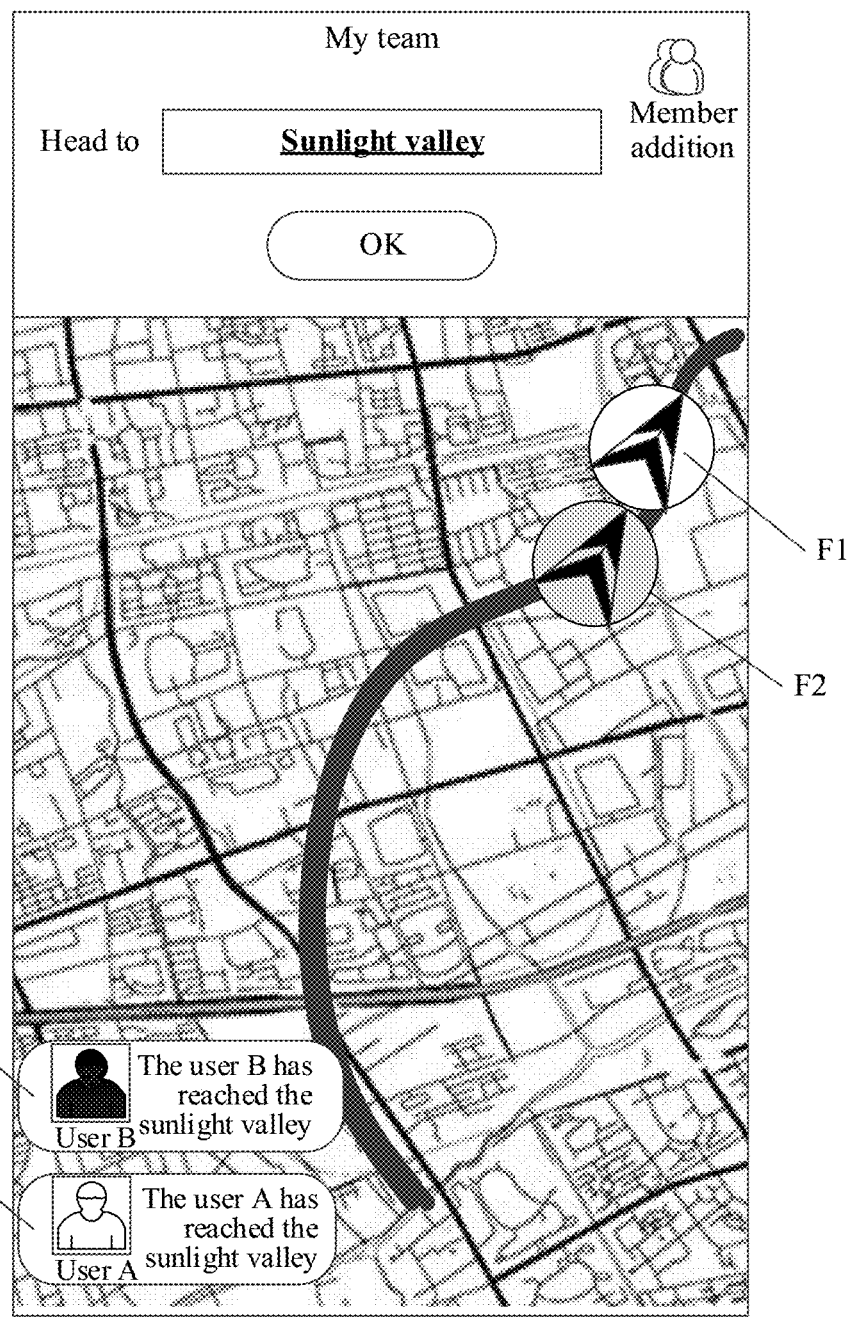
FIG. 14 is a schematic diagram of an interface of displaying real-time positioning information on a map navigation page according to an embodiment of this disclosure.

Referring to FIG. 14, FIG. 14 is a schematic diagram of an interface of displaying real-time positioning information on a map navigation page according to an embodiment of this disclosure. As shown in the figure, F1 is used for indicating real-time positioning information of a first social account, F2 is used for indicating real-time positioning information of a second social account, F3 is used for indicating a first prompt message, and F4 is used for indicating a second prompt message. As can be seen, real-time positioning information of each member in a team is displayed on the map navigation page. It is assumed that the first social account is a "user A", the second social account is a "user B", and the first location information is "sunlight valley". If the real-time positioning information of the user A has been located in a range of a destination, the real-time positioning information of the first social account successfully matches the first location information, and the first prompt message indicated by F3 is displayed on the map navigation page. If the real-time positioning information of the user B has been located in the range of the destination, the real-time positioning information of the second social account successfully matches the first location information, and the second prompt message indicated by F4 is displayed on the map navigation page.

The first prompt message and the second prompt message are not only synchronously updated to the session group of the instant messaging application, and may also be presented in team up interfaces of other applications in a form of a pop-up or a rolling notification.

The interface shown in FIG. 14 is merely exemplary, and in an actual application, a layout and displayed content of the interface may be adjusted as required, which is not limited herein.

In embodiments of this disclosure, a manner for notifying that a same location is reached through a map navigation page is provided. Through the foregoing manner, after each member in a team reaches a same destination, a related prompt message may be automatically transmitted on the map navigation page, for the members in the team to know a traveling situation of each other in real time and find a potential likely to occur in a traveling process in time, thereby improving the traveling safety of the user.

Based on the embodiment corresponding to FIG. 4, in another embodiment provided in this disclosure, the session group includes N social accounts, and N is an integer greater than 1. The method may further include displaying a first prompt message in the session group by the first terminal device in a case that the real-time positioning information of the first social account successfully matches the first location information; displaying a second prompt message in the session group by the first terminal device in a case that the real-time positioning information of the second social account successfully matches the first location information; and canceling displaying the session group in the instant messaging application by the first terminal device in a case that real-time positioning information of each social account in the N social accounts successfully matches the first location information.

In an embodiment, a manner for notifying that members in a team reach a same destination through a session group is described. As can be understood from the foregoing embodiments, all members in a team may head to a same destination, and the destination corresponds to the first location information. Based on this, in a case that a member in the team reaches the destination, a prompt message may be displayed in the session group. The following is described by using an example in which the team includes two members.

Figure 15:
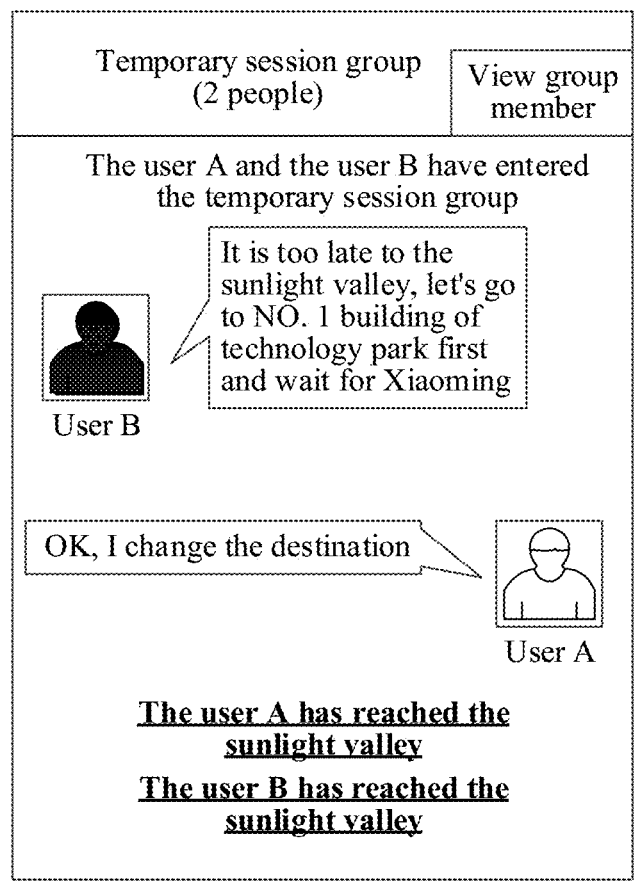
FIG. 15 is a schematic diagram of an interface of displaying real-time positioning information in a session group according to an embodiment of this disclosure.

FIG. 15 is a schematic diagram of an interface of displaying real-time positioning information in a session group according to an embodiment of this disclosure. It is assumed that the first social account is a "user A", the second social account is a "user B", and the first location information is "sunlight valley". If the real-time positioning information of the user A has been located in a range of a destination, the real-time positioning information of the first social account successfully matches the first location information, and a first prompt message, for example, "the user A has reached the sunlight valley" is displayed on the map navigation page. If the real-time positioning information of the user B has been located in the range of the destination, the real-time positioning information of the second social account successfully matches the first location information, and a second prompt message, for example, "the user B has reached the sunlight valley" is displayed on the map navigation page. If all members in the team reach the destination, the session group is automatically deleted.

The interface shown in FIG. 15 is merely exemplary, and in an actual application, a layout and displayed content of the interface may be adjusted as required, which is not limited herein.

In embodiments of this disclosure, a manner for notifying that members in a team reach a same destination is provided. Through the foregoing manner, after each member in a team reaches a same destination, a related prompt message may be automatically transmitted in the session group, for the members in the team to know a traveling situation of each other in real time and find a potential likely to occur in a traveling process in time, thereby improving the traveling safety of the user. In addition, if all members in the team reach the destination, the session group is automatically deleted, thereby simplifying user operations.

Based on the embodiment corresponding to FIG. 4, in another embodiment provided in this disclosure, the method may further include displaying a map navigation page by the first terminal device in response to a navigation viewing instruction, where the map navigation page displays real-time positioning information of the first social account and real-time positioning information of the second social account. The method may further include displaying a first prompt message on the map navigation page by the first terminal device in a case that the real-time positioning information of the first social account successfully matches the first location information. The method may further include displaying a second prompt message on the map navigation page by the first terminal device in a case that the real-time positioning information of the second social account successfully matches second location information, where the second location information is information reported by the second terminal device.

In an embodiment, a manner for notifying that different locations are reached through a map navigation page is described. As can be understood from the foregoing embodiments, all members in a team may head to different destinations. Based on this, in a case that each member in the team reaches a respective destination, a prompt message may be displayed on the map navigation page. The following is described by using an example in which the team includes two members.

Figure 16:
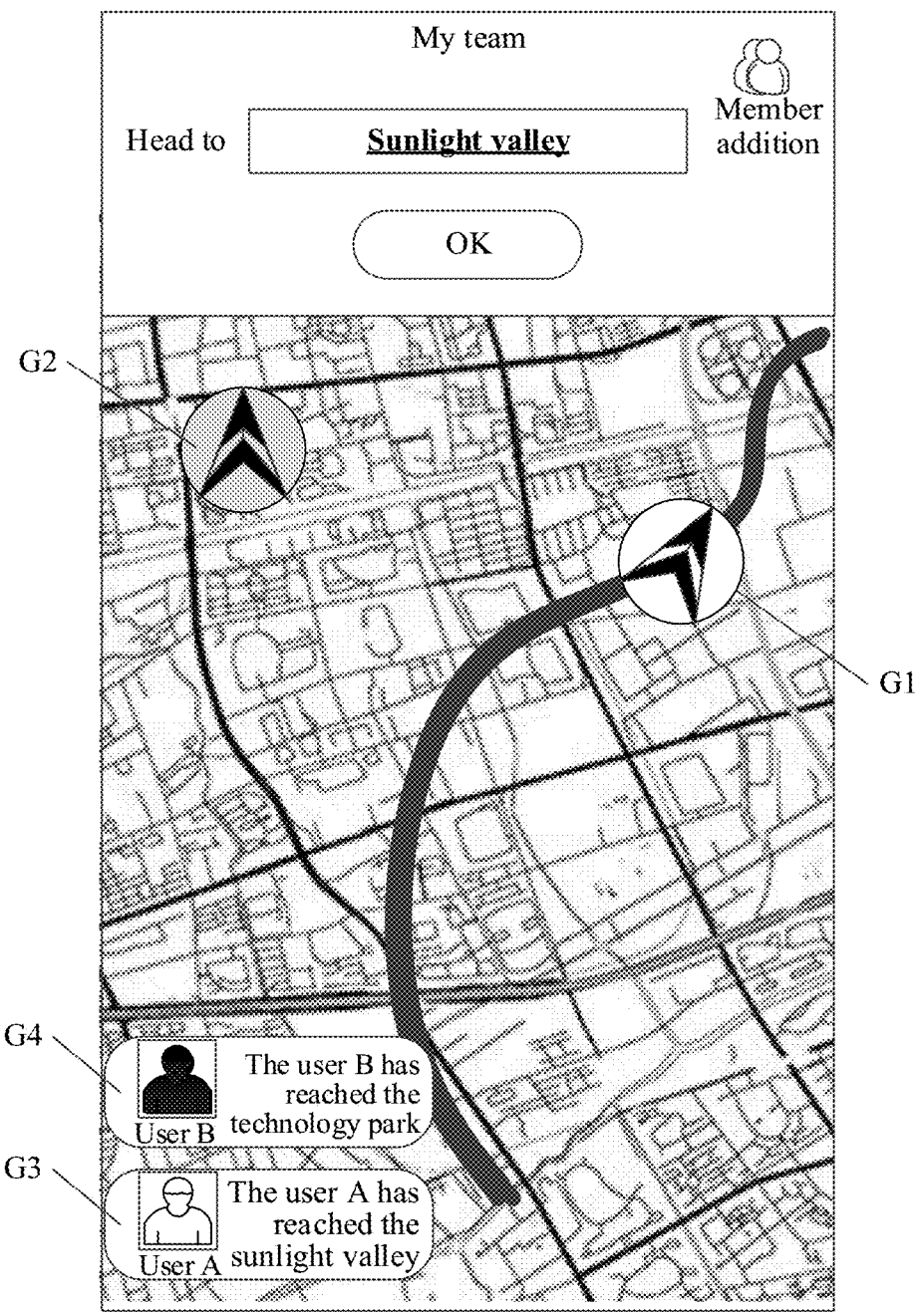
FIG. 16 is a schematic diagram of another interface of displaying real-time positioning information on a map navigation page according to an embodiment of this disclosure.

FIG. 16 is a schematic diagram of another interface of displaying real-time positioning information on a map navigation page according to an embodiment of this disclosure. As shown in the figure, G1 is used for indicating real-time positioning information of a first social account, G2 is used for indicating real-time positioning information of a second social account, G3 is used for indicating a first prompt message, and G4 is used for indicating a second prompt message. As can be seen, real-time positioning information of each member in a team is displayed on the map navigation page. It is assumed that the first social account is a "user A", the second social account is a "user B", the first location information is "sunlight valley", and the second location information is "technology park". If the real-time positioning information of the user A has been located in a range of a destination, the real-time positioning information of the first social account successfully matches the first location information, and the first prompt message indicated by G3 is displayed on the map navigation page. If the real-time positioning information of the user B has been located in the range of the destination, the real-time positioning information of the second social account successfully matches the second location information, and the second prompt message indicated by G4 is displayed on the map navigation page.

The first prompt message and the second prompt message are not only synchronously updated to the session group of the instant messaging application, and may also be presented in team up interfaces of other applications in a form of a pop-up or a rolling notification.

The interface shown in FIG. 16 is merely exemplary, and in an actual application, a layout and displayed content of the interface may be adjusted as required, which is not limited herein.

In embodiments of this disclosure, a manner for notifying that different locations are reached through a map navigation page is provided. Through the foregoing manner, after each member in a team reaches a corresponding destination respectively, a related prompt message may be automatically transmitted on the map navigation page, for the members in the team to know a traveling situation of each other in real time and find a potential likely to occur in a traveling process in time, thereby improving the traveling safety of the user.

Based on the embodiment corresponding to FIG. 4, in another embodiment provided in this disclosure, the session group includes N social accounts, and N is an integer greater than 1. The method may further include displaying a first prompt message in the session group by the first terminal device in a case that the real-time positioning information of the first social account successfully matches the first location information. The method may further include displaying a second prompt message in the session group by the first terminal device in a case that the real-time positioning information of the second social account successfully matches the second location information. The method may further include canceling displaying the session group in the instant messaging application by the first terminal device in a case that real-time positioning information of each social account in the N social accounts successfully matches corresponding location information respectively.

In an embodiment, a manner for notifying that members in a team reach different destinations through a session group is described. As can be understood from the foregoing embodiments, all members in a team may head to different destinations. Based on this, in a case that each member in the team reaches a respective destination, a prompt message may be displayed in the session group. The following is described by using an example in which the team includes two members.

Figure 17:
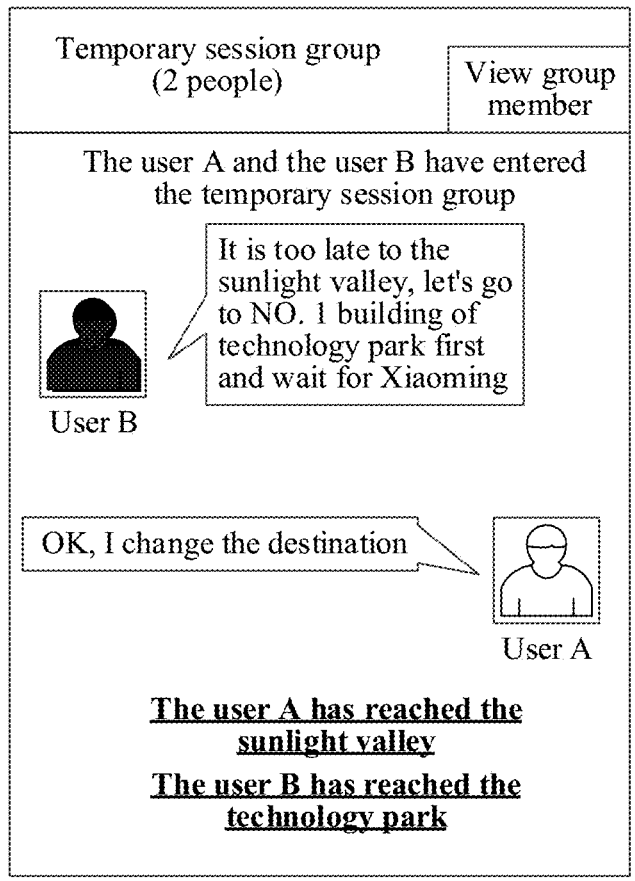
FIG. 17 is a schematic diagram of another interface of displaying real-time positioning information in a session group according to an embodiment of this disclosure.

FIG. 17 is a schematic diagram of another interface of displaying real-time positioning information in a session group according to an embodiment of this disclosure. It is assumed that the first social account is a "user A", the second social account is a "user B", the first location information is "sunlight valley", and the second location information is "technology park". If the real-time positioning information of the user A has been located in a range of a destination, the real-time positioning information of the first social account successfully matches the first location information, and a first prompt message, for example, "the user A has reached the sunlight valley" is displayed on the map navigation page. If the real-time positioning information of the user B has been located in the range of the destination, the real-time positioning information of the second social account successfully matches the second location information, and a second prompt message, for example, "the user B has reached the technology park" is displayed on the map navigation page. If all members in the team reach respective destinations, the session group is automatically deleted.

The interface shown in FIG. 17 is merely exemplary, and in an actual application, a layout and displayed content of the interface may be adjusted as required, which is not limited herein.

In embodiments of this disclosure, a manner for notifying that members in a team reach different destinations is provided. Through the foregoing manner, after each member in a team reaches a corresponding destination respectively, a related prompt message may be automatically transmitted in the session group, for the members in the team to know a traveling situation of each other in real time and find a potential likely to occur in a traveling process in time, thereby improving the traveling safety of the user. In addition, if all members in the team reach the destination, the session group is automatically deleted, thereby simplifying user operations.

Figure 18:
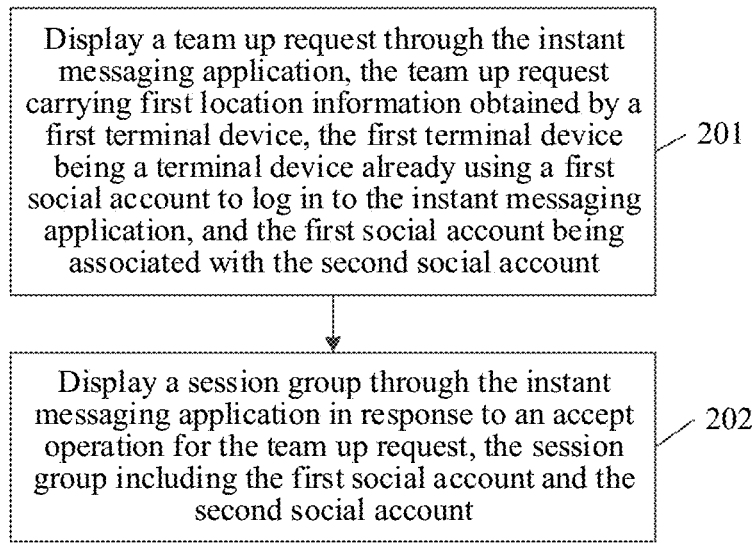
FIG. 18 is another schematic flowchart of a session group establishment method according to an embodiment of this disclosure.

The following describes the communication method in this disclosure in terms of a second terminal device in combination with the foregoing description, where the second terminal device is a terminal device already using a second social account to log in to an instant messaging application. Referring to FIG. 18, another embodiment of a session group establishment method in embodiments of this disclosure includes the following steps.

In step 201, the second terminal device displays a team up request through the instant messaging application, the team up request carrying first location information obtained by a first terminal device, the first terminal device being a terminal device already using a first social account to log in to the instant messaging application, and the first social account being associated with the second social account. In an example, a first request to share locations in a group session from a second messaging application is displayed by a first messaging application. The first messaging application is associated with a first user account and a first terminal device. The second application is associated with a second user and a second terminal device. The first request to share locations includes destination location information.

In an embodiment, the first terminal device obtains first location information, where the first location information may be manually input by a user, or may be obtained through automatic positioning, or may be recommended based on a frequently-used place, which is not limited herein. The team up traveling initiator triggers a team up invitation instruction through the first terminal device, and the team up invitation instruction carries the second social account. The first terminal device determines, in response to the team up invitation instruction, a second terminal device bound to the second social account. Therefore, the first terminal device transmits a team up request to the second terminal device, where the team up request carries the first social account. Based on this, the second terminal device displays the team up request in the instant messaging application.

It may be understood that, the first terminal device is a terminal device used by a team up traveling initiator, and the first terminal device is bound to the first social account of the instant messaging application. It is assumed that the team up traveling initiator is a user A, the user A installs an instant messaging application on the first terminal device, and an account used by the user A in the instant messaging application is the first social account, for example, "user123". The second terminal device is a terminal device used by a team up traveling recipient, and the second social account is associated with the first social account, namely, the first social account and the second social account may have a "friend" relationship or a frequent contact relationship. It is assumed that the team up traveling recipient is a user B, and the user B installs an instant messaging application on the second terminal device. The instant messaging application installed by the user B on the second terminal device and the instant messaging application installed by the user A on the first terminal device are the same application or different applications that may invoke user information from each other.

In step 202, the second terminal device displays a session group through the instant messaging application in response to an accept operation for the team up request, the session group including the first social account and the second social account. In an example, a user input is received to accept the first request to share locations in the group session. A group session interface of the group session is displayed by the first messaging application in response to the first request to share locations in the group session being accepted. The group session includes the first user account and the second user account.

In an embodiment, a recipient corresponding to the second terminal device may determine whether to accept the team up request according to the first location information. If the team up traveling recipient accepts the team up request, it is determined that the second terminal device responds to the accept operation, and a session group is displayed through the instant messaging application. Based on this, in one case, a server of the instant messaging application creates a temporary session, namely, generates a session group. In another case, the first terminal device or the second terminal device creates a temporary session, namely, generates a session group. The first terminal device and the second terminal device respectively creates a local temporary session, namely, generates a session group. Regardless of a generation manner of the session group, the session group includes the first social account and the second social account. Based on this, the team up traveling initiator and the team up recipient may communicate with each other in the session group without manually creating a session.

Figure 19:
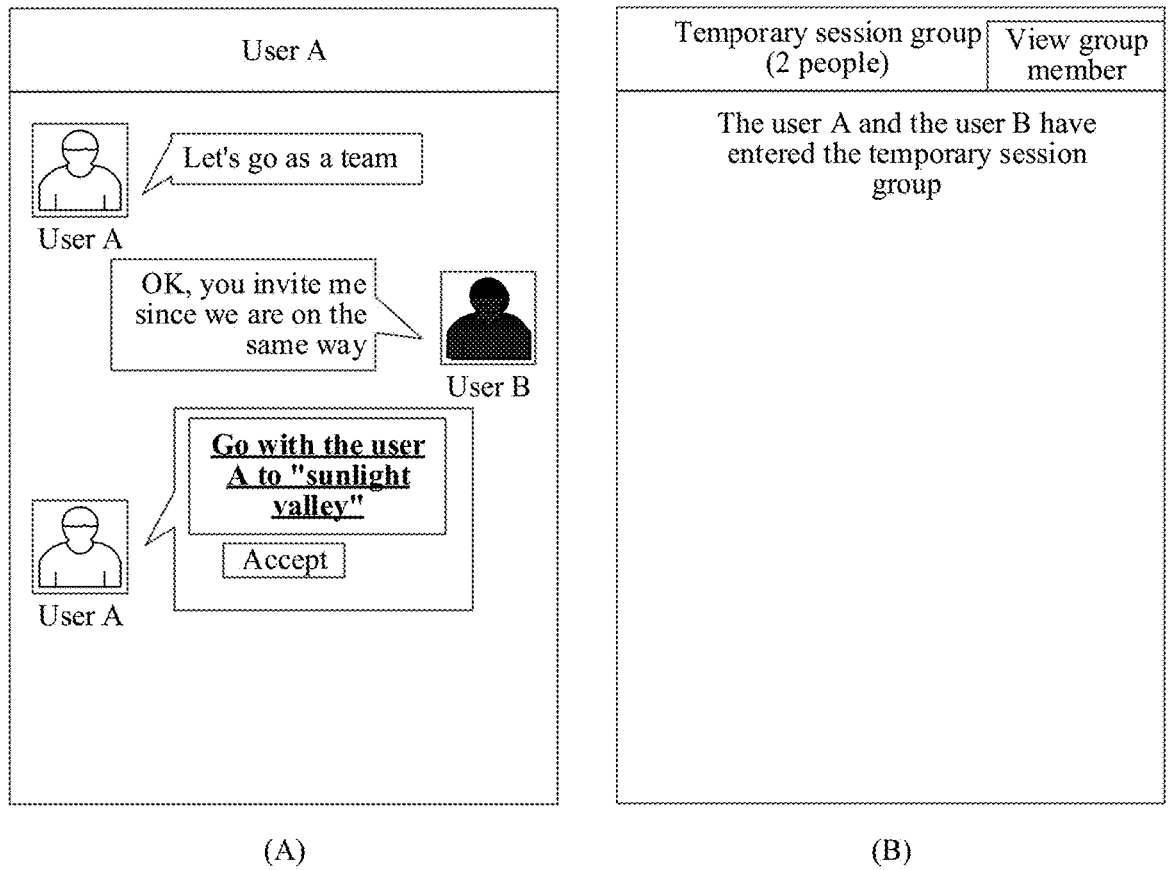
FIG. 19 is a schematic diagram of another interface of creating a temporary session group according to an embodiment of this disclosure.

For ease of understanding, FIG. 19 is a schematic diagram of another interface of creating a temporary session group according to an embodiment of this disclosure. It is assumed that a team up traveling initiator is user A and a team up traveling recipient is a user B, in an interface shown by a diagram (A) in FIG. 19, the user A transmits a team up request to the user B, where the team up request may include first location information. If the first location information is "sunlight valley", a related prompt, for example, "go to sunlight valley together with the user A" is displayed in a session interface of the instant messaging application. If the user B clicks an "accept" control, namely, the user B accepts the team up request, a session group is created. For example, the session group is a temporary session group, and both the user A and the user B enter the temporary session group. As shown by a diagram (B) in FIG. 19, a related prompt, for example, "the user A and the user B have entered the temporary session group" is displayed in a created temporary session group.

The interface shown in FIG. 5 is merely exemplary, and in an actual application, a layout and displayed content of the interface may be adjusted as required, which is not limited herein.

The foregoing example is described by using an example in which the session group only includes two members. In an actual application, one session group may include a team up traveling initiator and at least one team up traveling recipient, and one recipient herein is merely exemplary and is not to be construed as a limitation to this disclosure.

In embodiments of this disclosure, a communication method is provided. According to the foregoing method, after a team up initiator successfully invites a friend to team up, a session group for the instant messaging application may be automatically generated, where the session group includes a social account of the team up initiator and a social account of the friend. Based on this, users in a team may directly communicate with each other in the session group without frequently switching between applications, thereby improving the operation convenience.

Based on the embodiment corresponding to FIG. 4, in another embodiment provided in this disclosure, the method may further include displaying a friend list corresponding to the instant messaging application by the second terminal device in response to a friend list view request, where the friend list includes a third social account, and the third social account are associated with the second social account. The method may further include triggering a team up invitation instruction by the second terminal device in response to a selection instruction for the third social account in the friend list. The method may further include transmitting the team up request to a third terminal device in response to the team up invitation instruction, where the third terminal device is a terminal device already using the third social account to log in to the instant messaging application. The method may further include displaying the session group through the instant messaging application by the second terminal device in response to a second response instruction of the third terminal device, where the second response instruction being used for indicating that the third terminal device accepts the team up request, and the session group further includes the third social account.

In an embodiment, a manner for inviting more friends to join a team is described. As can be understood from the foregoing embodiments, the team up recipient may further enter a corresponding friend list through a bound social account, to select at least one social account from the friend list and invite the at least one social account to join a team.

Figure 20:
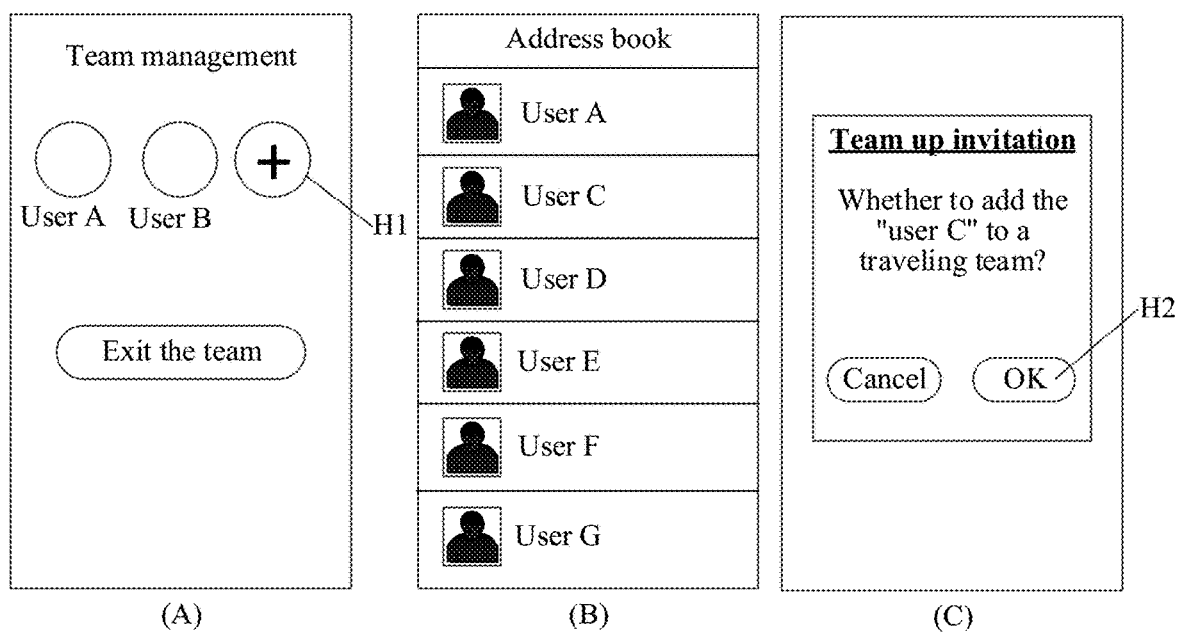
FIG. 20 is a schematic diagram of another interface of selecting a team up teammate through a friend list according to an embodiment of this disclosure.

For ease of understanding, FIG. 20 is a schematic diagram of another interface of selecting a team up teammate through a friend list according to an embodiment of this disclosure. As shown by a diagram (A) in FIG. 20, the team up traveling initiator uses a second social account, and the second social account is a social account of an instant messaging application A. Based on this, after the team up traveling recipient clicks a "+" control indicated by H1, a friend list view request is triggered, and a friend list (namely, an address book) shown by a diagram (B) in FIG. 20 is displayed. It is assumed that the third social account is a "user C", the team up traveling initiator clicks a portrait of the "user C" in the friend list to trigger a selection instruction for the third social account in the friend list.

In one case, after the selection instruction for the third social account in the friend list is triggered, a team up invitation instruction is directly generated. In another case, after the selection instruction for the third social account in the friend list is triggered, an interface shown by a diagram (C) in FIG. 20 may be displayed. The interface prompts whether the team up traveling recipient determines to add the user C to a traveling team, and a team up invitation instruction is generated if an "OK" control indicated by H2 is clicked. If a "No" control is clicked, the friend list or the team up page is returned. After the "user C" accepts the team up request, a second response instruction is transmitted to the second terminal device, so that the third social account may be added to the session group.

The interface shown in FIG. 20 is merely exemplary, and in an actual application, a layout and displayed content of the interface may be adjusted as required, which is not limited herein.

In embodiments of this disclosure, a manner for inviting more friends to join a team is provided. Through the foregoing manner, the team up traveling recipient may further invite friends to join a created team. Therefore, on one hand, the team member selection flexibility is improved, and on the other hand, a team scale may be enlarged, thereby further improving the sense of interaction and the sense of communication between users.

Figure 21:
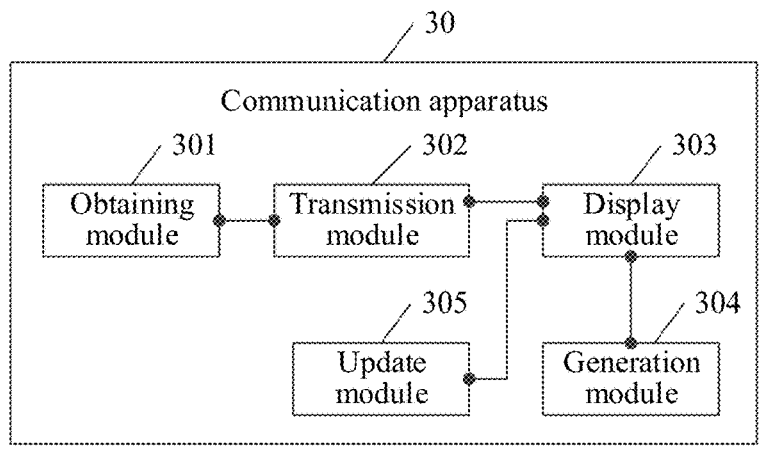
FIG. 21 is a schematic diagram of a communication apparatus according to an embodiment of this disclosure.

FIG. 21 is a schematic diagram of a communication apparatus according to an embodiment of this disclosure. The communication apparatus is applicable to a first terminal device, where the first terminal device is a terminal device already using a first social account to log in to an instant messaging application, and the communication apparatus 30 includes an obtaining module 301, a transmission module 302, and a display module 303. One or more modules, submodules, and/or units of the apparatus can be implemented by processing circuitry, software, or a combination thereof, for example.

The obtaining module 301 is configured to obtain first location information. The transmission module 302 is configured to transmit a team up request to a second terminal device in response to a team up invitation instruction, the team up request carrying the first location information, the second terminal device being a terminal device already using a second social account to log in to the instant messaging application, and the second social account being associated with the first social account. The display module 303 is configured to display a session group through the instant messaging application in response to a first response instruction transmitted by the second terminal device, the first response instruction being used for indicating that the second terminal device accepts the team up request, and the session group including the first social account and the second social account.

In embodiments of this disclosure, a communication apparatus is provided. According to the foregoing apparatus, after a team up initiator successfully invites a friend to team up, a session group for the instant messaging application may be automatically generated, where the session group includes a social account of the team up initiator and a social account of the friend. Based on this, users in a team may directly communicate with each other in the session group without frequently switching between applications, thereby improving the operation convenience.

In a possible implementation, based on the embodiment corresponding to FIG. 21, in another embodiment of the communication apparatus 30 provided in this disclosure, the display module 303 is further configured to display a map application interface, where the map application interface provides a team up creation control. The display module 303 is further configured to display a team up page in response to a selection instruction for the team up creation control, where the team up page displays an information input region. The obtaining module 301 is specifically configured to obtain, in response to a text input operation for the information input region, the first location information according to the text input operation.

In embodiments of this disclosure, a communication apparatus is provided. According to the foregoing apparatus, the team up initiator may directly trigger a team up traveling function based on an installed map application. Therefore, the team up capability of the map application and the communication capability of the instant messaging application are tightly combined, to improve the communication convenience.

In a possible implementation, based on the embodiment corresponding to FIG. 21, in another embodiment of the communication apparatus 30 provided in embodiments of this disclosure, the display module 303 is further configured to display a session interface of the instant messaging application, where the session interface provides a team up creation control, the session interface is a communication interface between the first social account and at least one social account, and the at least one social account includes the second social account. The display module 303 is further configured to display a team up page in response to a selection instruction for the team up creation control, where the team up page displays an information input region. The obtaining module 301 is specifically configured to obtain, in response to a text input operation for the information input region, the first location information according to the text input operation.

In embodiments of this disclosure, a communication apparatus is provided. According to the foregoing apparatus, the team up initiator may directly trigger a team up traveling function based on an installed instant messaging application. Therefore, the team up capability of the map application and the communication capability of the instant messaging application are tightly combined, and map team up and messages in the instant messaging application may be synchronized with each other. Even if a user does not download the map application, the user may still join the team, and receive and transmit team up messages to each member in the team, thereby improving the communication convenience.

In a possible implementation, based on the embodiment corresponding to FIG. 21, in another embodiment of the communication apparatus 30 provided in embodiments of this disclosure, the display module 303 is further configured to display an application main interface of the instant messaging application, where the application main interface provides a subprogram entry control. The display module 303 is further configured to display a team up page of an application subprogram in response to a selection instruction for the subprogram entry control, where the team up page displays an information input region, and the application subprogram is executed in an environment provided by the instant messaging application. The obtaining module 301 is specifically configured to obtain, in response to a text input operation for the information input region, the first location information according to the text input operation.

In embodiments of this disclosure, a communication apparatus is provided. According to the foregoing apparatus, the team up initiator may directly trigger a team up traveling function based on an applet. Therefore, the team up capability of the map application and the communication capability of the instant messaging application are tightly combined, and map team up and messages in the instant messaging application may be synchronized with each other. Even if a user does not download the map application, the user may still join the team, and receive and transmit team up messages to each member in the team, thereby improving the communication convenience.

In a possible implementation, based on the embodiment corresponding to FIG. 21, in another embodiment of the communication apparatus 30 provided in embodiments of this disclosure, the display module 303 is further configured to display an on-board map interface through an on-board system, where the on-board system is logged in to by using the first social account, and the on-board map interface provides a team up creation control. The display module 303 is further configured to display a team up page through the on-board system in response to a selection instruction for the team up creation control, where the team up page displays an information input region. The obtaining module 301 is specifically configured to obtain, in response to a text input operation for the information input region, the first location information according to the text input operation.

In embodiments of this disclosure, a communication apparatus is provided. According to the foregoing apparatus, the team up initiator may directly trigger a team up traveling function based on an on-board system. Therefore, the team up capability of the map application, the on-board system, and the communication capability of the instant messaging application are tightly combined, and map team up and messages in the instant messaging application may be synchronized with each other. Even if a user does not download the map application, the user may still join the team, and receive and transmit team up messages to each member in the team, thereby improving the communication convenience.

In a possible implementation, based on the embodiment corresponding to FIG. 21, in another embodiment of the communication apparatus 30 provided in this disclosure, the communication apparatus 30 further includes a generation module 304. The display module 303 is further configured to display, before the transmission module 302 transmits a team up request to a second terminal device in response to a team up invitation instruction, a friend list corresponding to the instant messaging application in response to a friend list view request, where the friend list includes the second social account. The generation module 304 is configured to trigger the team up invitation instruction in response to a selection instruction for the second social account in the friend list.

In embodiments of this disclosure, a communication apparatus is provided. According to the foregoing apparatus, the team up initiator may also directly invoke a friend list to select one or more friends and invite the one or more friends to a traveling team. This process may be directly implemented in the instant messaging application or may be implemented by a map application pulling up a friend list of the team up initiator. Therefore, the solution has relatively high flexibility and operability.

In a possible implementation, based on the embodiment corresponding to FIG. 21, in another embodiment of the communication apparatus 30 provided in this disclosure, the display module 303 is further configured to cancel, after displaying a session group through the instant messaging application, displaying the session group in the instant messaging application in a case that a duration of the session group reaches a duration threshold. The display module 303 is further configured to cancel displaying the session group in the instant messaging application in a case that a current moment reaches a preset moment. The display module 303 is further configured to cancel displaying the session group in the instant messaging application in a case that each social account in the session group exits the session group. The display module 303 is further configured to cancel displaying the session group in the instant messaging application in a case of detecting a dismiss instruction for the session group.

In embodiments of this disclosure, a communication apparatus is provided. According to the foregoing apparatus, for a temporarily created session group, a plurality of strategies are designed to automatically delete the session group. Therefore, on one hand, the diversity and flexibility of solution implementation are improved, and on the other hand, it is unnecessary to depend on manual operations, thereby improving the convenience of the solution.

In a possible implementation, based on the embodiment corresponding to FIG. 21, in another embodiment of the communication apparatus 30 provided in this disclosure, the communication apparatus 30 further includes an update module 305, where the update module 305 is configured to change the first location information to obtain updated location information after the display module 303 displays a session group through the instant messaging application. The display module 303 is further configured to display the updated location information in the session group in response to a location switching instruction.

In embodiments of this disclosure, a communication apparatus is provided. According to the foregoing apparatus, if a member in a team changes destination information, updated destination information may be synchronously displayed in the session group, for members in the team to know and view the updated information in time, thereby improving the flexibility of the solution.

In a possible implementation, based on the embodiment corresponding to FIG. 21, in another embodiment of the communication apparatus 30 provided in this disclosure, the display module 303 is further configured to display a map navigation page in response to a navigation viewing instruction, where the map navigation page displays real-time positioning information of the first social account and real-time positioning information of the second social account. The display module 303 is further configured to display a first prompt message on the map navigation page in a case that the real-time positioning information of the first social account successfully matches the first location information. The display module 303 is further configured to display a second prompt message on the map navigation page in a case that the real-time positioning information of the second social account successfully matches the first location information.

In embodiments of this disclosure, a communication apparatus is provided. According to the foregoing apparatus, after each member in a team reaches a same destination, a related prompt message may be automatically transmitted on the map navigation page, for the members in the team to know a traveling situation of each other in real time and find a potential likely to occur in a traveling process in time, thereby improving the traveling safety of the user.

In a possible implementation, based on the embodiment corresponding to FIG. 21, in another embodiment of the communication apparatus 30 provided in this disclosure, the session group includes N social accounts, and N is an integer greater than 1. The display module 303 is further configured to cancel displaying the session group in the instant messaging application in a case that real-time positioning information of each social account in the N social accounts successfully matches the first location information.

In embodiments of this disclosure, a communication apparatus is provided. According to the foregoing apparatus, after each member in a team reaches a same destination, a related prompt message may be automatically transmitted in the session group, for the members in the team to know a traveling situation of each other in real time and find a potential likely to occur in a traveling process in time, thereby improving the traveling safety of the user. In addition, if all members in the team reach the destination, the session group is automatically deleted, thereby simplifying user operations.

In a possible implementation, based on the embodiment corresponding to FIG. 21, in another embodiment of the communication apparatus 30 provided in this disclosure, the display module 303 is further configured to display a map navigation page in response to a navigation viewing instruction, where the map navigation page displays real-time positioning information of the first social account and real-time positioning information of the second social account. The display module 303 is further configured to display a first prompt message on the map navigation page in a case that the real-time positioning information of the first social account successfully matches the first location information. The display module 303 is further configured to display a second prompt message on the map navigation page in a case that the real-time positioning information of the second social account successfully matches second location information, where the second location information is information reported by the second terminal device.

In embodiments of this disclosure, a communication apparatus is provided. According to the foregoing apparatus, after each member in a team reaches a corresponding destination respectively, a related prompt message may be automatically transmitted on the map navigation page, for the members in the team to know a traveling situation of each other in real time and find a potential likely to occur in a traveling process in time, thereby improving the traveling safety of the user.

In a possible implementation, based on the embodiment corresponding to FIG. 21, in another embodiment of the communication apparatus 30 provided in this disclosure, the session group includes N social accounts, and N is an integer greater than 1. The display module 303 is further configured to cancel displaying the session group in the instant messaging application in a case that real-time positioning information of each social account in the N social accounts successfully matches corresponding location information respectively.

In embodiments of this disclosure, a communication apparatus is provided. According to the foregoing apparatus, after each member in a team reaches a corresponding destination respectively, a related prompt message may be automatically transmitted in the session group, for the members in the team to know a traveling situation of each other in real time and find a potential likely to occur in a traveling process in time, thereby improving the traveling safety of the user. In addition, if all members in the team reach the destination, the session group is automatically deleted, thereby simplifying user operations.

Figure 22:
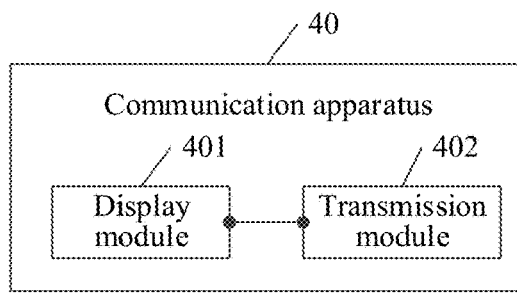
FIG. 22 is another schematic diagram of a communication apparatus according to an embodiment of this disclosure.

The following describes a communication apparatus in this disclosure in detail. Referring to FIG. 22, FIG. 22 is a schematic diagram of another embodiment of a communication apparatus according to an embodiment of this disclosure. The communication apparatus is applicable to a second terminal device, where the second terminal device is a terminal device already using a second social account to log in to an instant messaging application, and the communication apparatus 40 includes a display module 401. One or more modules, submodules, and/or units of the apparatus can be implemented by processing circuitry, software, or a combination thereof, for example.

The display module 401 is configured to display a team up request through the instant messaging application, the team up request carrying first location information obtained by a first terminal device, the first terminal device being a terminal device already using a first social account to log in to the instant messaging application, and the first social account being associated with the second social account. The display module 401 is further configured to display a session group through the instant messaging application in response to an accept operation for the team up request, the session group including the first social account and the second social account.

In embodiments of this disclosure, a communication apparatus is provided. According to the foregoing apparatus, after a team up initiator successfully invites a friend to team up, a session group for the instant messaging application may be automatically generated, where the session group includes a social account of the team up initiator and a social account of the friend. Based on this, users in a team may directly communicate with each other in the session group without frequently switching between applications, thereby improving the operation convenience.

In a possible implementation, based on the embodiment corresponding to FIG. 22, in another embodiment of the communication apparatus 40 provided in this disclosure, the communication apparatus 40 further includes a transmission module 402, where the display module 401 is further configured to display a friend list corresponding to the instant messaging application in response to a friend list view request, where the friend list includes a third social account, and the third social account are associated with the second social account. The transmission module 402 is configured to trigger a team up invitation instruction in response to a selection instruction for the third social account in the friend list; and transmit the team up request to a third terminal device in response to the team up invitation instruction, where the third terminal device is a terminal device already using the third social account to log in to the instant messaging application. The display module 401 is further configured to display the session group through the instant messaging application in response to a second response instruction of the third terminal device, where the second response instruction is used for indicating that the third terminal device accepts the team up request, and the session group further includes the third social account.

In embodiments of this disclosure, a communication apparatus is provided. According to the foregoing apparatus, the team up traveling recipient may further invite friends to join a created team. Therefore, on one hand, the team member selection flexibility is improved, and on the other hand, a team scale may be enlarged, thereby further improving the sense of interaction and the sense of communication between users.

Figure 23:
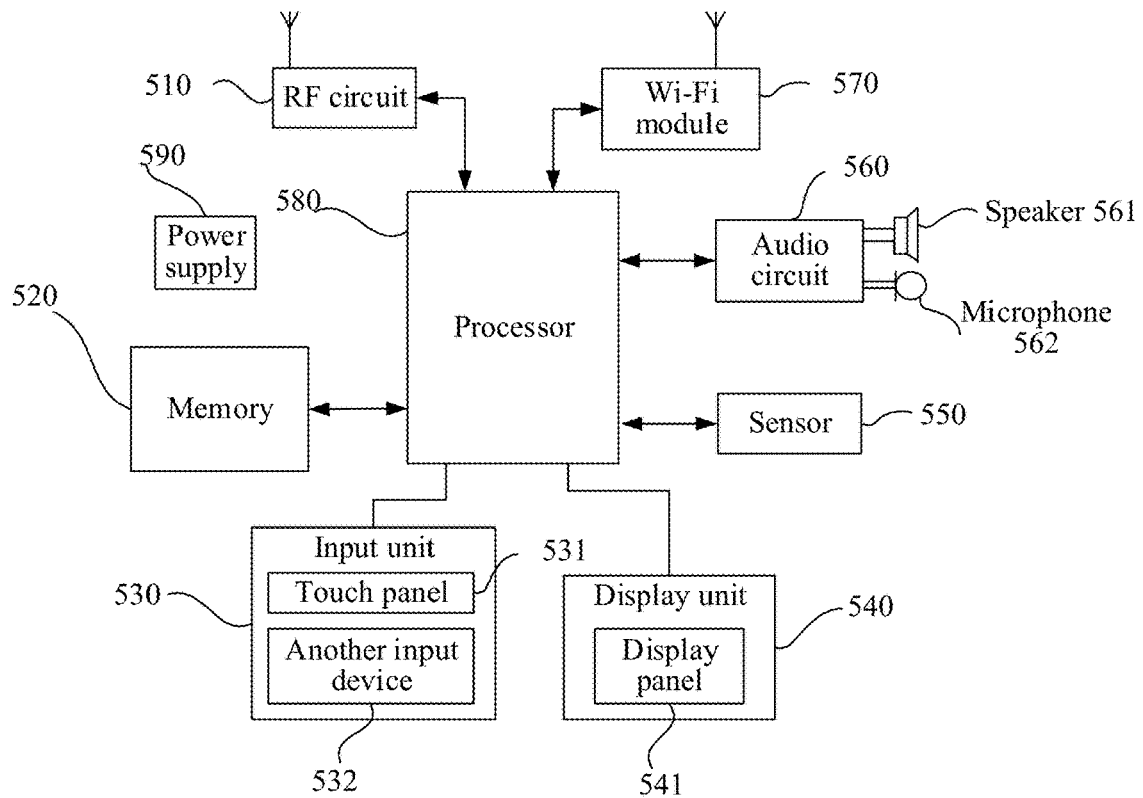
FIG. 23 is a schematic diagram of a terminal device according to an embodiment of this disclosure.

An embodiment of this disclosure further provides another communication apparatus. As shown in FIG. 23, for ease of description, only parts related to the embodiments of this disclosure are shown. For specific technical details that are not disclosed, reference may be made to the method part in embodiments of this disclosure. The terminal device may be any terminal device including a mobile phone, a tablet computer, a personal digital assistant (PDA), a point of sales (POS), and an on-board computer, and the terminal device being a mobile phone is used as an example.

FIG. 23 is a block diagram of a part of a structure of the mobile phone related to the terminal device according to an embodiment of this disclosure. Referring to FIG. 23, the mobile phone includes components such as a radio frequency (RF) circuit 510, a memory 520, an input unit 530, a display unit 540, a sensor 550, an audio circuit 560, a Wi-Fi module 570, a processor 580, and a power supply 590. The input unit 530 may include a touch panel 531 and another input device 532, the display unit 540 may include a display panel 541, and the audio circuit 560 may include a speaker 561 and a microphone 562. A person skilled in the art may understand that the structure of the mobile phone shown in FIG. 23 does not constitute a limitation on the mobile phone, and the mobile phone may include more components or fewer components than those shown in the figure, or some components may be combined, or a different component deployment may be used.

Steps performed by the terminal device in the foregoing embodiments may be based on the structure of the terminal device shown in FIG. 23.

An embodiment of this disclosure further provides a computer-readable storage medium (such as a non-transitory computer-readable storage medium), storing a computer program, the computer program, when run on a computer, causing the computer to perform the methods described in the foregoing embodiments.

An embodiment of this disclosure further provides a computer program product including a program, the computer program product, when run on a computer, causing the computer to perform the methods described in the foregoing embodiments.

A person skilled in the art should understand that, for the purpose of convenient and brief description, for a detailed working process of the system, apparatus, and unit described above, reference may be made to a corresponding process in the method embodiments, as examples, and details are not described herein again.

In the several embodiments provided in this disclosure, it is to be understood that the disclosed system, apparatus, and method may be implemented in other manners. For example, the described apparatus embodiments are only exemplary. For example, the division of the units is only a logical function division and may be other divisions during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separated. Parts displayed as units may or may not be physical units, and may be located in one position, or may be distributed on a plurality of network units. Some or all of the units may be selected according to actual needs to achieve the objectives of the solutions of the embodiments.

In addition, functional units in embodiments of this disclosure may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of this disclosure may be implemented in a form of a software product. The computer software product is stored in a storage medium and includes a plurality of instructions for instructing a computer device (which may be a personal computer, a server, a network device, or the like) to perform all or some of the steps of the methods described in embodiments of this disclosure. The foregoing storage medium includes: any medium that can store program code, such as a USB flash drive, a removable hard disk, a read-only memory (ROM), a random access memory (RAM), a magnetic disk, or an optical disc.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing embodiments are merely intended for describing technical solutions of this disclosure, and not for limiting this disclosure. It is to be understood by a person of ordinary skill in the art that although this disclosure has been described with reference to the foregoing embodiments, modifications may still be made to the technical solutions described in the foregoing embodiments, or equivalent replacements may be made to some technical features in the technical solutions and are within the scope of this disclosure.

What is claimed is:

1. A communication method, comprising:
    sending, by a first messaging application that is associated with a first user account and a first terminal device, a request to share locations in a group session to a second messaging application, the second messaging application being associated with a second user account and a second terminal device, the request to share locations including destination location information;
    displaying, by the first messaging application, a group session interface of the group session in response to the request to share locations associated with the first user account and the second user account in the group session being accepted by the second user account, the group session including the first user account and the second user account;
    displaying a map indicating real-time positioning information associated with the first user account and real-time positioning information associated with the second user account in response to a navigation viewing instruction;
    displaying a first prompt message on the map when the real-time positioning information of the first user account matches the first destination location information; and
    displaying a second prompt message on the map when the real-time positioning information of the second user account matches second destination location information.

2. The communication method according to claim 1, further comprising:
    displaying a shared locations creation interface of the first messaging application; and
    receiving a destination to be shared in the group session via the shared locations creation interface.

3. The communication method according to claim 1, further comprising:
    displaying a messaging interface that is configured to display messages in the group session;
    receiving a user input to share locations via the messaging interface;
    displaying a shared locations creation interface of the first messaging application; and
    receiving a destination to be shared in the group session via the shared locations creation interface.

4. The communication method according to claim 1, further comprising:
    displaying a subprogram selection interface of the first messaging application;
    displaying a shared locations creation interface of the first messaging application based on the selection of a subprogram in the subprogram selection interface; and
    receiving a destination to be shared in the group session via the shared locations creation interface.

5. The communication method according to claim 1, wherein the first terminal device includes an infotainment system of a vehicle.

6. The communication method according to claim 1, wherein before the sending the request to share locations in the group session, the method further comprises:
    displaying a friend list of the first user account in response to a friend list view request, the friend list including the second user account; and
    sending the request to share locations in the group session to the second messaging application based on a selection of the second user account in the friend list.

7. The communication method according to claim 1, wherein after the group session interface is displayed, the method further comprises:
    canceling the group session when one of (i) a duration of the group session reaches a duration threshold, (ii) a current time reaches a preset time, (iii) a set number of user accounts in the group session exits the group session, and (iv) the group session is canceled by one of the user accounts in the group session.

8. The communication method according to claim 1, wherein after the group session interface is displayed, the method further comprises:
    changing the destination location information to obtain updated location information; and
    displaying the updated first destination location information in the group session interface in response to a location switching instruction.

9. The communication method according to claim 1, wherein
    the first destination location information and the second destination location information include same destination location information.

10. The communication method according to claim 9, further comprising:
    canceling the group session when real-time positioning information of each user account included in the group session matches the destination location information.

11. The communication method according to claim 1, wherein the first destination location information is different from the second location information.

12. The communication method according to claim 11, further comprising:
canceling the group session when real-time positioning information of each of user account included in the group session matches destination location information corresponding to the respective user account.

13. A communication method, comprising:
displaying, by a first messaging application associated with a first user account and a first terminal device, a first request to share locations in a group session from a second messaging application, the second application being associated with a second user account and a second terminal device, the first request to share locations including first destination location information;
receiving a user input to accept the first request to share locations associated with the first user account and the second user account in the group session;
displaying, by the first messaging application, a group session interface of the group session in response to the first request to share locations associated with the first user account and the second user account in the group session being accepted, the group session including the first user account and the second user account;
displaying a map indicating real-time positioning information associated with the first user account and real-time positioning information associated with the second user account in response to a navigation viewing instruction;
displaying a first prompt message on the map when the real-time positioning information of the first user account matches the first destination location information; and
displaying a second prompt message on the map when the real-time positioning information of the second user account matches second destination location information.

14. The communication method according to claim 13, further comprising:
displaying a friend list of the first user account in response to a friend list view request, the friend list including a third user account that is associated with the second user account; and
sending a second request to share locations in the group session to a third messaging application that is associated with the third user account and a third terminal device based on a selection of the third user account in the friend list,
wherein the third user account is added to the group session in response to the second request to share locations in the group session being accepted.

15. A terminal device, comprising:
processing circuitry configured to:
send, via a first messaging application that is associated with a first user account, a request to share locations in a group session to a second messaging application, the second messaging application being associated with a second user account and another terminal device, the request to share locations including destination location information;
display, via the first messaging application, a group session interface of the group session in response to the request to share locations associated with the first user account and the second user account in the group session being accepted by the second user account, the group session including the first user account and the second user account;
display a map indicating real-time positioning information associated with the first user account and real-time positioning information associated with the second user account in response to a navigation viewing instruction;
display a first prompt message on the map when the real-time positioning information of the first user account matches the first destination location information; and
display a second prompt message on the map when the real-time positioning information of the second user account matches second destination location information.

16. The terminal device according to claim 15, wherein the processing circuitry is configured to:
display a shared locations creation interface of the first messaging application; and
receive a destination to be shared in the group session via the shared locations creation interface.

17. The terminal device according to claim 15, wherein the processing circuitry is configured to:
display a messaging interface that is configured to display messages in the group session;
receive a user input to share locations via the messaging interface;
display a shared locations creation interface of the first messaging application; and
receive a destination to be shared in the group session via the shared locations creation interface.

18. The terminal device according to claim 15, wherein the processing circuitry is configured to:
display a subprogram selection interface of the first messaging application;
display a shared locations creation interface of the first messaging application based on the selection of a subprogram in the subprogram selection interface; and
receive a destination to be shared in the group session via the shared locations creation interface.

19. A non-transitory computer-readable storage medium, storing instructions which when executed by a processor cause the processor to perform the communication method according to claim 1.

20. A non-transitory computer-readable storage medium, storing instructions which when executed by a processor cause the processor to perform the communication method according to claim 13.

* * * * *